(12) United States Patent
Hasuike

(10) Patent No.: US 7,646,937 B2
(45) Date of Patent: Jan. 12, 2010

(54) IMAGE DISPLAY METHOD

(75) Inventor: Akira Hasuike, Tokyo (JP)

(73) Assignee: Sapience Corporation, Tokyo (JP)

( * ) Notice: Subject to any disclaimer, the term of this patent is extended or adjusted under 35 U.S.C. 154(b) by 514 days.

(21) Appl. No.: 10/824,388

(22) Filed: Apr. 14, 2004

(65) Prior Publication Data

US 2004/0207654 A1 Oct. 21, 2004

(30) Foreign Application Priority Data

Apr. 17, 2003 (JP) ............... 2003-112998

(51) Int. Cl.
*G06K 9/32* (2006.01)
(52) U.S. Cl. ..................... 382/295
(58) Field of Classification Search ........... None
See application file for complete search history.

(56) References Cited

U.S. PATENT DOCUMENTS

| | | | |
|---|---|---|---|
| 5,745,910 A * | 4/1998 | Piersol et al. | 715/515 |
| 6,192,393 B1 * | 2/2001 | Tarantino et al. | 709/203 |
| 6,230,171 B1 * | 5/2001 | Pacifici et al. | 715/512 |
| 2002/0025084 A1 | 2/2002 | Yang | |
| 2002/0051583 A1 * | 5/2002 | Brown et al. | 382/299 |
| 2002/0111970 A1 | 8/2002 | Saito | |

FOREIGN PATENT DOCUMENTS

| | | |
|---|---|---|
| EP | 0933694 A1 | 7/1998 |
| JP | 06-274587 | 9/1994 |
| JP | 11-088866 | 3/1999 |
| JP | 2002-170113 | 6/2002 |
| JP | 2002-236701 | 8/2002 |

* cited by examiner

*Primary Examiner*—Brian P Werner
*Assistant Examiner*—Elisa M Rice
(74) *Attorney, Agent, or Firm*—James V. Costigan; Hedman & Costigan, P.C.

(57) ABSTRACT

The present invention provides an image display method for downloading an image of large longitudinal and transverse size and displaying it on a viewer with less latency time.

The image display method may be used to divide an image larger than a display region of a viewer into a plurality of areas where each divided image is provided beforehand in a server. The viewer determines the plural divided images of which at least a part of each is contained in the display region of the viewer in accordance with a relative position between the image and the display region of the viewer and makes a preferential request of the viewer for the divided images. The viewer rearranges and displays the received divided images in their original form.

17 Claims, 15 Drawing Sheets

Image data of the same paper

FIG.4

```
<HTML>
<DIV ID= canvas BLOCK>
    <DIV ID= canvas 0000></DIV>
    <DIV ID= canvas 0100></DIV>
    <DIV ID= canvas 0200></DIV>
    <DIV ID= canvas 0300></DIV>
    <DIV ID= canvas 0400></DIV>
    <DIV ID= canvas 0500></DIV>
    <DIV ID= canvas 0001></DIV>
        .
        .
        .
    <DIV ID= canvas 0505></DIV>
</DIV>
```

Connect (6×6) cells with DIV (BLOCK)

Prepare DIV for cell storing image data

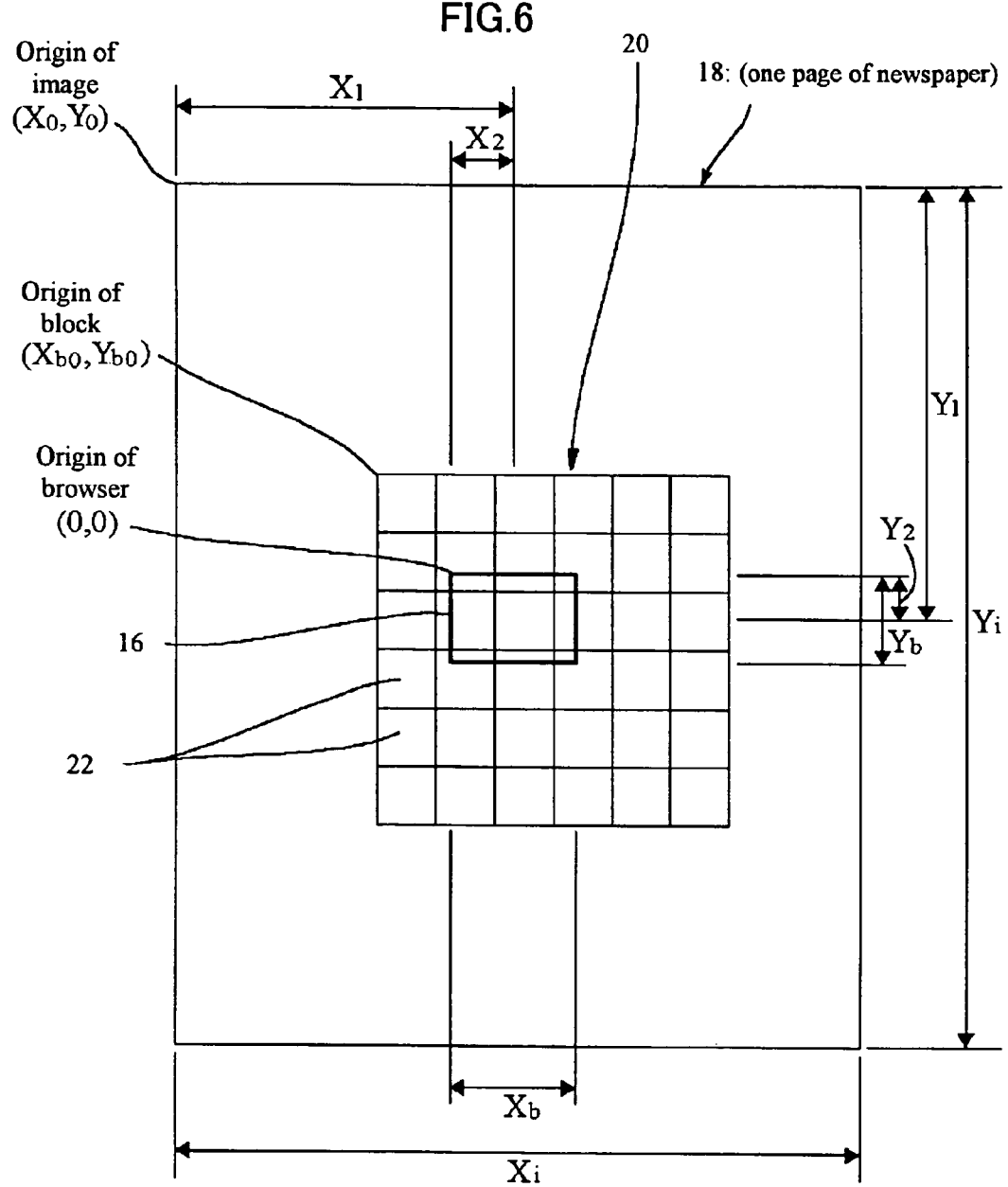

Without offset

With offset

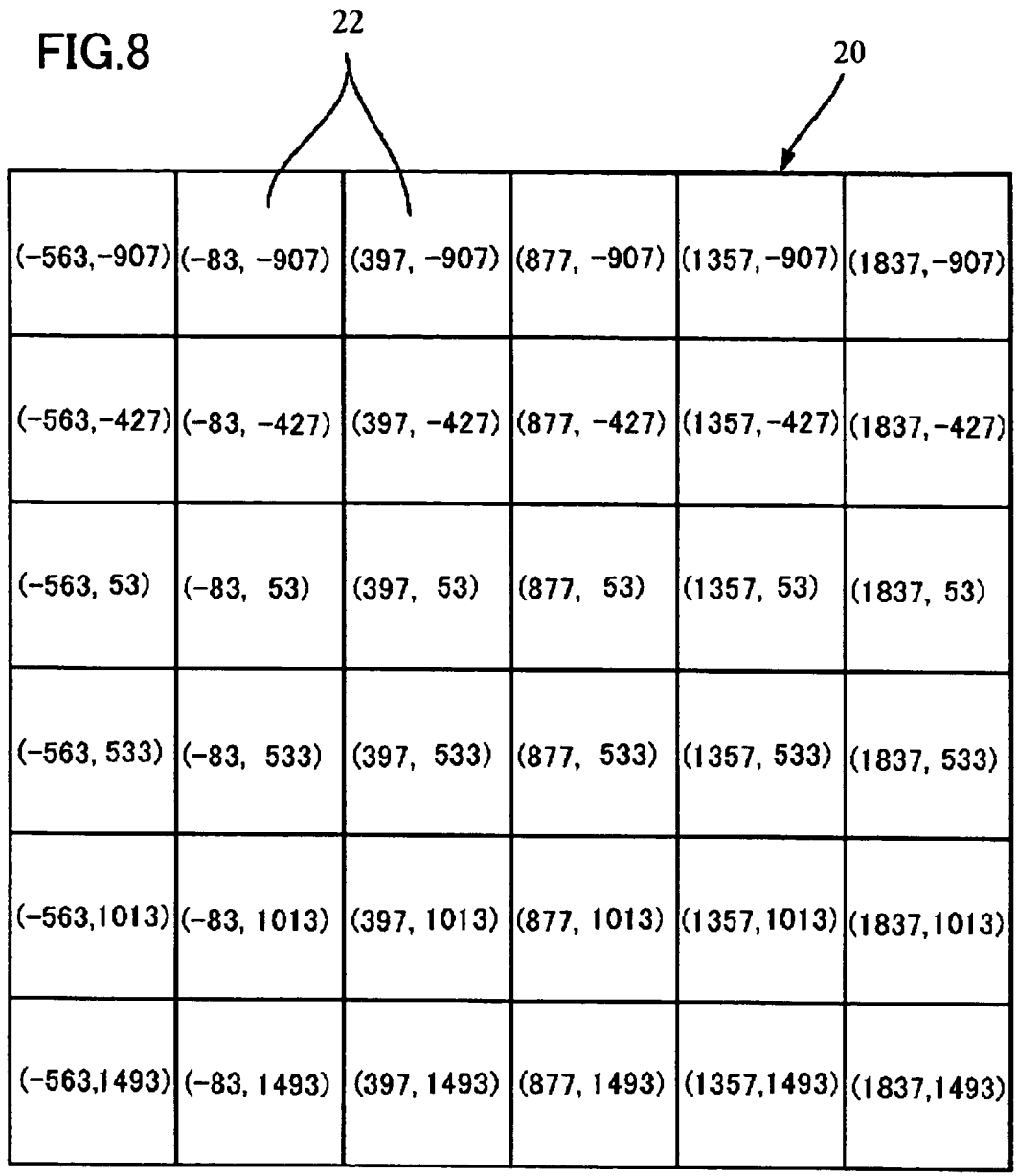

FIG.9

18: (one page of newspaper)

Upper stage: coordinate value of divided image
Lower stage: cell number

| [0,0] | [1,0] | [2,0] | [3,0] | [4,0] | [5,0] | [6,0] | [7,0] | [8,0] | [9,0] | [10,0] | [11,0] | [12,0] |
|---|---|---|---|---|---|---|---|---|---|---|---|---|
| (0,0) | (1,0) | (2,0) | (3,0) | (4,0) | (5,0) | (0,0) | (1,0) | (2,0) | (3,0) | (4,0) | (5,0) | (0,0) |
| [0,1] | [1,1] | [2,1] | [3,1] | [4,1] | [5,1] | [6,1] | [7,1] | [8,1] | [9,1] | [10,1] | [11,1] | [12,1] |
| (0,1) | (1,1) | (2,1) | (3,1) | (4,1) | (5,1) | (0,1) | (1,1) | (2,1) | (3,1) | (4,1) | (5,1) | (0,1) |
| [0,2] | [1,2] | [2,2] | [3,2] | [4,2] | [5,2] | [6,2] | [7,2] | [8,2] | [9,2] | [10,2] | [11,2] | [12,2] |
| (0,2) | (1,2) | (2,2) | (3,2) | (4,2) | (5,2) | (0,2) | (1,2) | (2,2) | (3,2) | (4,2) | (5,2) | (0,2) |
| [0,3] | [1,3] | [2,3] | [3,3] | [4,3] | [5,3] | [6,3] | [7,3] | [8,3] | [9,3] | [10,3] | [11,3] | [12,3] |
| (0,3) | (1,3) | (2,3) | (3,3) | (4,3) | (5,3) | (0,3) | (1,3) | (2,3) | (3,3) | (4,3) | (5,3) | (0,3) |
| [0,4] | [1,4] | [2,4] | [3,4] | [4,4] | [5,4] | [6,4] | [7,4] | [8,4] | [9,4] | [10,4] | [11,4] | [12,4] |
| (0,4) | (1,4) | (2,4) | (3,4) | (4,4) | (5,4) | (0,4) | (1,4) | (2,4) | (3,4) | (4,4) | (5,4) | (0,4) |
| [0,5] | [1,5] | [2,5] | [3,5] | [4,5] | [5,5] | [6,5] | [7,5] | [8,5] | [9,5] | [10,5] | [11,5] | [12,5] |
| (0,5) | (1,5) | (2,5) | (3,5) | (4,5) | (5,5) | (0,5) | (1,5) | (2,5) | (3,5) | (4,5) | (5,5) | (0,5) |
| [0,6] | [1,6] | [2,6] | [3,6] | [4,6] | [5,6] | [6,6] | [7,6] | [8,6] | [9,6] | [10,6] | [11,6] | [12,6] |
| (0,0) | (1,0) | (2,0) | (3,0) | (4,0) | (5,0) | (0,0) | (1,0) | (2,0) | (3,0) | (4,0) | (5,0) | (0,0) |
| [0,7] | [1,7] | [2,7] | [3,7] | [4,7] | [5,7] | [6,7] | [7,7] | [8,7] | [9,7] | [10,7] | [11,7] | [12,7] |
| (0,1) | (1,1) | (2,1) | (3,1) | (4,1) | (5,1) | (0,1) | (1,1) | (2,1) | (3,1) | (4,1) | (5,1) | (0,1) |
| [0,8] | [1,8] | [2,8] | [3,8] | [4,8] | [5,8] | [6,8] | [7,8] | [8,8] | [9,8] | [10,8] | [11,8] | [12,8] |
| (0,2) | (1,2) | (2,2) | (3,2) | (4,2) | (5,2) | (0,2) | (1,2) | (2,2) | (3,2) | (4,2) | (5,2) | (0,2) |
| [0,9] | [1,9] | [2,9] | [3,9] | [4,9] | [5,9] | [6,9] | [7,9] | [8,9] | [9,9] | [10,9] | [11,9] | [12,9] |
| (0,3) | (1,3) | (2,3) | (3,3) | (4,3) | (5,3) | (0,3) | (1,3) | (2,3) | (3,3) | (4,3) | (5,3) | (0,3) |
| [0,10] | [1,10] | [2,10] | [3,10] | [4,10] | [5,10] | [6,10] | [7,10] | [8,10] | [9,10] | [10,10] | [11,10] | [12,10] |
| (0,4) | (1,4) | (2,4) | (3,4) | (4,4) | (5,4) | (0,4) | (1,4) | (2,4) | (3,4) | (4,4) | (5,4) | (0,4) |
| [0,11] | [1,11] | [2,11] | [3,11] | [4,11] | [5,11] | [6,11] | [7,11] | [8,11] | [9,11] | [10,11] | [11,11] | [12,11] |
| (0,5) | (1,5) | (2,5) | (3,5) | (4,5) | (5,5) | (0,5) | (1,5) | (2,5) | (3,5) | (4,5) | (5,5) | (0,5) |
| [0,12] | [1,12] | [2,12] | [3,12] | [4,12] | [5,12] | [6,12] | [7,12] | [8,12] | [9,12] | [10,12] | [11,12] | [12,12] |
| (0,0) | (1,0) | (2,0) | (3,0) | (4,0) | (5,0) | (0,0) | (1,0) | (2,0) | (3,0) | (4,0) | (5,0) | (0,0) |
| [0,13] | [1,13] | [2,13] | [3,13] | [4,13] | [5,13] | [6,13] | [7,13] | [8,13] | [9,13] | [10,13] | [11,13] | [12,13] |
| (0,1) | (1,1) | (2,1) | (3,1) | (4,1) | (5,1) | (0,1) | (1,1) | (2,1) | (3,1) | (4,1) | (5,1) | (0,1) |
| [0,14] | [1,14] | [2,14] | [3,14] | [4,14] | [5,14] | [6,14] | [7,14] | [8,14] | [9,14] | [10,14] | [11,14] | [12,14] |
| (0,2) | (1,2) | (2,2) | (3,2) | (4,2) | (5,2) | (0,2) | (1,2) | (2,2) | (3,2) | (4,2) | (5,2) | (0,2) |
| [0,15] | [1,15] | [2,15] | [3,15] | [4,15] | [5,15] | [6,15] | [7,15] | [8,15] | [9,15] | [10,15] | [11,15] | [12,15] |
| (0,3) | (1,3) | (2,3) | (3,3) | (4,3) | (5,3) | (0,3) | (1,3) | (2,3) | (3,3) | (4,3) | (5,3) | (0,3) |
| [0,16] | [1,16] | [2,16] | [3,16] | [4,16] | [5,16] | [6,16] | [7,16] | [8,16] | [9,16] | [10,16] | [11,16] | [12,16] |
| (0,4) | (1,4) | (2,4) | (3,4) | (4,4) | (5,4) | (0,4) | (1,4) | (2,4) | (3,4) | (4,4) | (5,4) | (0,4) |

FIG.10

```
function setImageSell(){
    originX = X_{b0};          // X axis origin of first cell in block (expression 19)
    originY = Y_{b0};          // Y axis origin of first cell in block (expression 20)
    for(x=0; x<= S_{xl}; x++){ // From first divided image to last divided image in X axis
                               //   direction of image
        for(y=0; y<= S_{yl}; y++){ // From first divided image to last divided image in Y axis
                                   //   direction of image // Performed from first cell to last cell in X axis for block if(x >= S_{xf} && x <= S_{xl}){ sellX = x % 6;      // Residue of x divided by 6 is used as cell number in X axis
                                    //   direction
                // Performed from first cell to last cell in Y axis for block if(y >= S_{yf} && y <= S_{yl}){ sellY = y % 6;  // Residue of y divided by 6 is used as cell number in Y axis
                                    //   direction
                    // Store image data (imageXY) in each cell (canvasXY)
                    // Performed actually when CGI makes a request to server for image data
                    document.all("canvas" + sellX + sellY).innerHTML = "<IMG ID= 'image" +
                        x + y + "'SRC='image.cgi?a=xxx&b=xxx&c=xxx&d=xxx&e=xxx&f=
                        xxx&g=xxx' STYLE='left:" + originX +";top:" + originY + ";'>";
                }
            }
            originY += 480;     // Add 480 to set Y axis origin of next cell
        }
        originX += 480;         // Add 480 to set X axis origin of next cell
        originY = Y_{b0};       // Restore Y axis origin to Y axis origin of first cell in Y axis
    }
    originX = X_{b0};           // Restore X axis origin to X axis origin of first cell in X axis
}
```

FIG.13

```
document.onmousedown = setMouseDown; // When mouse is down
document.onmousemove = setMouseMove; // When mouse is moved function setMouseDown(){
        downX    = event.x;  // X axis coordinate clicked
        downY    = event.y;  // Y axis coordinate clicked
        originX  = downX - document.all. canvasBlock.style.pixelLeft;
        originY  = downY - document.all. canvasBlock.style.pixelTop;
} function setMouseMove(){
        dragX    = event.x;  // X axis coordinate during movement
        dragY    = event.y;  // Y axis coordinate during movement
        // Recalculate origin of block
        document.all. canvasBlock.style.pixelLeft = dragX - originX;
        document.all. canvasBlock.style.pixelTop  = dragY - originY;
}
```

FIG.14A

Upper stage: divided image coordinate value
Lower stage: cell number

| [4,6]<br>(4,0) | [5,6]<br>(5,0) | [6,6]<br>(0,0) | [7,6]<br>(1,0) | [8,6]<br>(2,0) | [9,6]<br>(3,0) |
|---|---|---|---|---|---|
| [4,7]<br>(4,1) | [5,7]<br>(5,1) | [6,7]<br>(0,1) | [7,7]<br>(1,1) | [8,7]<br>(2,1) | [9,7]<br>(3,1) |
| [4,8]<br>(4,2) | [5,8]<br>(5,2) | [6,8]<br>(0,2) | [7,8]<br>(1,2) | [8,8]<br>(2,2) | [9,8]<br>(3,2) |
| [4,9]<br>(4,3) | [5,9]<br>(5,3) | [6,9]<br>(0,3) | [7,9]<br>(1,3) | [8,9]<br>(2,3) | [9,9]<br>(3,3) |
| [4,10]<br>(4,4) | [5,10]<br>(5,4) | [6,10]<br>(0,4) | [7,10]<br>(1,4) | [8,10]<br>(2,4) | [9,10]<br>(3,4) |
| [4,11]<br>(4,5) | [5,11]<br>(5,5) | [6,11]<br>(0,5) | [7,11]<br>(1,5) | [8,11]<br>(2,5) | [9,11]<br>(3,5) |

Before moving the image

FIG.14B

Upper stage: divided image coordinate value
Lower stage: cell number

| [3,6]<br>(3,0) | [4,6]<br>(4,0) | [5,6]<br>(5,0) | [6,6]<br>(0,0) | [7,6]<br>(1,0) | [8,6]<br>(2,0) |
|---|---|---|---|---|---|
| [3,7]<br>(3,1) | [4,7]<br>(4,1) | [5,7]<br>(5,1) | [6,7]<br>(0,1) | [7,7]<br>(1,1) | [8,7]<br>(2,1) |
| [3,8]<br>(3,2) | [4,8]<br>(4,2) | [5,8]<br>(5,2) | [6,8]<br>(0,2) | [7,8]<br>(1,2) | [8,8]<br>(2,2) |
| [3,9]<br>(3,3) | [4,9]<br>(4,3) | [5,9]<br>(5,3) | [6,9]<br>(0,3) | [7,9]<br>(1,3) | [8,9]<br>(2,3) |
| [3,10]<br>(3,4) | [4,10]<br>(4,4) | [5,10]<br>(5,4) | [6,10]<br>(0,4) | [7,10]<br>(1,4) | [8,10]<br>(2,4) |
| [3,11]<br>(3,5) | [4,11]<br>(4,5) | [5,11]<br>(5,5) | [6,11]<br>(0,5) | [7,11]<br>(1,5) | [8,11]<br>(2,5) |

After moving the image

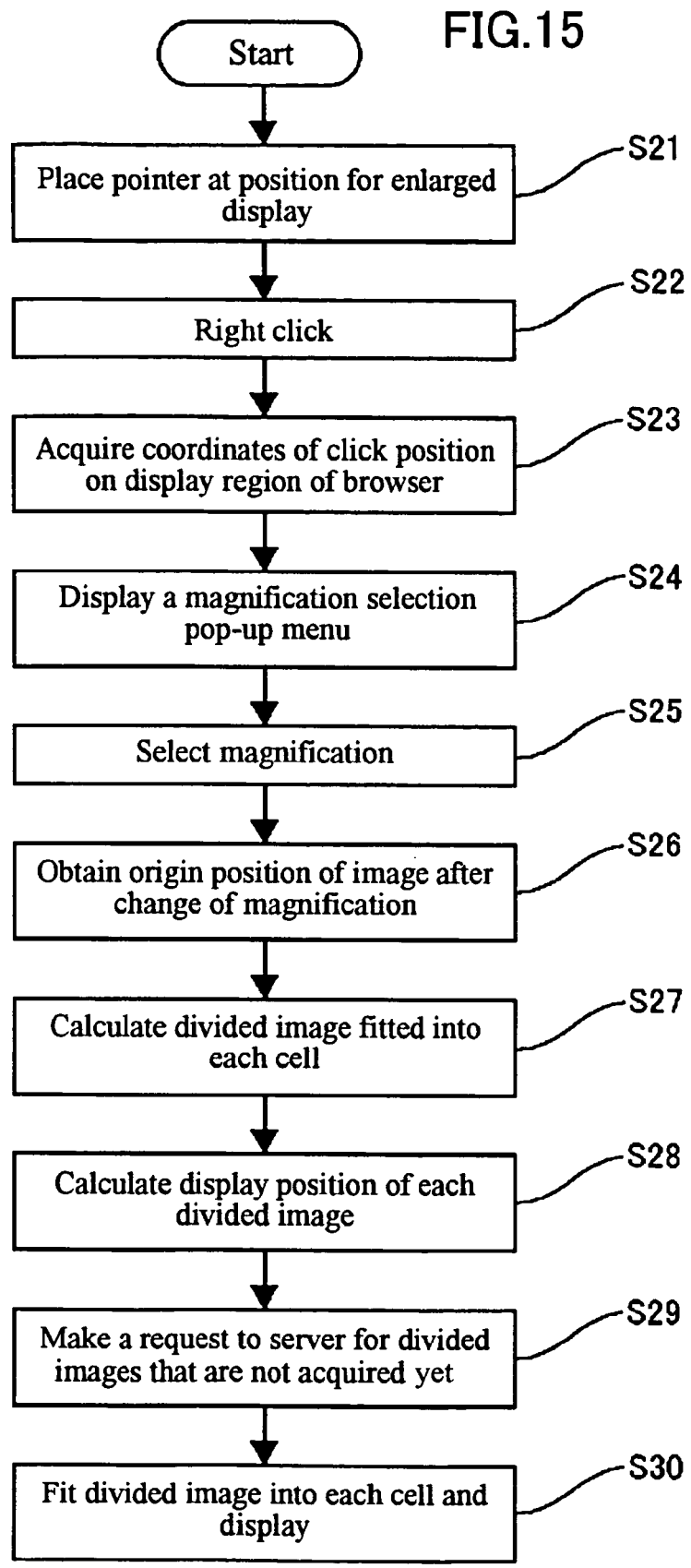

IMAGE DISPLAY METHOD

BACKGROUND OF THE INVENTION

1. Field of the Invention

The present invention relates to a method for downloading an image larger than a display region of a viewer from a server and displaying the image on the viewer.

2. Description of the Related Art

With the development of the Internet, the information around the world can be perused on the browser. The image information can be also perused on the browser. This is implemented by storing an HTML file describing that an image file such as a JPEG file is displayed on a Web server. Distribution and perusal of newspaper images employing the Internet technology have been put to practical use. A technique for distribution and perusal of newspaper images employing the Internet technology was described in the following patent document 1, for example.

[Patent Document 1]
Japanese Patent Laid-Open No. 2002-236701

SUMMARY OF THE INVENTION

Conventionally, it took a long latency time to download an image of large longitudinal and transverse size (number of pixels) such as a newspaper image and display it on the browser employing the Internet technology.

Also, distribution and perusal of newspaper image employing the Internet technology was conventionally implemented by procuring a dedicated software (plug-in software, dedicated viewer) that is started from the browser. Even the software such as well-known VeriSign (registered trademark) approved by an approval committee is only able to prove the manufacturing company, but there is no guarantee for the software itself, whereby the user is responsible for the use of software. In practice, since new techniques are successively added to the browser, it is very difficult for the general user to understand a trend of the browser, and selectively use the software with self-responsibility. Therefore, the general user is often anxious about using the plug-in software, and some users refuse to use the plug-in software due to the problems of security, virus and breakage of hard disk.

This invention has been achieved in the light of the above-mentioned problems, and it is an object of the invention to provide an image display method for downloading an image of large longitudinal and transverse size (number of pixels) and displaying it on a viewer with less latency time. Also, it is another object of the invention to provide a method for implementing the image display method without a plug-in software.

This invention provides an image display method for downloading an image larger than a display region of a viewer from a server and displaying the image on the viewer, comprising dividing the image into a plurality of areas, so that each divided image may be transmittable from the server, determining each divided image at least a part of which is contained in the display region of the viewer in accordance with a relative position between the image and the display region of the viewer, and enabling the corresponding divided image to be preferentially transmitted from the server.

This invention provides an image display method for downloading an image larger than a display region of a viewer from a server and displaying the image on the viewer, comprising dividing the image into a plurality of areas, each divided image being provided beforehand in the server, determining each divided image at least a part of which is contained in the display region of the viewer in accordance with a relative position between the image and the display region of the viewer, and enabling the corresponding divided image to be preferentially transmitted from the server.

This invention provides an image display method for downloading an image larger than a display region of a viewer from a server and displaying the image on the viewer, comprising dividing the image into a plurality of areas, each area having a shorter length in one or both of a transverse direction and a longitudinal direction than the display region of the viewer, each divided image being provided beforehand in the server, determining each divided image at least a part of which is contained in the display region of the viewer in accordance with a relative position between the image and the display region of the viewer, and enabling the corresponding divided images to be preferentially transmitted from the server, in which the transmitted divided images are rearranged in an original state and displayed on the viewer.

This invention provides an image display method for downloading an image larger than a display region of a viewer from a server and displaying the image on the viewer, comprising dividing the image into a plurality of areas, each divided image being provided beforehand in the server, the viewer determining each divided image at least a part of which is contained in the display region of the viewer in accordance with a relative position between the image and the display region of the viewer, and making a preferential request to the server for the divided image, and the server preferentially transmitting the divided image in response to the request, in which the viewer displays the received divided image.

This invention provides an image display method for downloading an image larger than a display region of a viewer from a server and displaying the image on the viewer, comprising dividing the image into a plurality of areas, each area having a shorter length in one or both of a transverse direction and a longitudinal direction than the display region of the viewer, each divided image being provided beforehand in the server, the viewer determining each divided image at least a part of which is contained in the display region of the viewer in accordance with a relative position between the image and the display region of the viewer, and making a preferential request to the server for the divided images, and the server preferentially transmitting the divided images in response to the request, in which the viewer rearranges and displays the received divided images in an original state.

With the image display method of this invention, each divided image at least a part of which is contained in the display region of the viewer is determined in accordance with a relative position between the image and the display region of the viewer, and the server preferentially transmits the corresponding divided image, whereby the image is displayed for the viewer with less latency time than transmitting and displaying the entire image.

The image display method of this invention may further comprise determining each surrounding divided image adjacent to the area of the divided image contained in the display region of the viewer, which is contained within a limited range of image area in a predetermined positional relation to the display region of the viewer, and enabling the corresponding divided image to be preferentially transmitted from the server.

Also, the image display method may further comprising determining whether or not the divided image is already downloaded and stored in the viewer, in which if the divided image is already stored, the stored divided image is read out and displayed without downloading it from the server again.

Also, the divided image is obtained by dividing the image like a lattice in one or both of the transverse direction and the longitudinal direction. In this case, the lattice is formed by dividing the image in the transverse direction at every preset number of pixels from a left end position of the image as a start point, formed by dividing the image in the longitudinal direction at every preset number of pixels from an upper end position of the image as the start point, or formed by dividing the image in the transverse direction at every preset number of pixels from the left end position of the image as the start point and dividing the image in the longitudinal direction at every preset number of pixels from the upper end position of the image as the start point.

Also, the image display method may further comprise setting a predetermined number of frame elements on the viewer, the frame elements corresponding to the display region to fit and display the divided images contained within a limited range of image area in a predetermined positional relation to the display region of the viewer, including the divided image at least a part of which is contained in the display region of the viewer, the divided image at corresponding position being fitted into each frame element and displayed, determining each divided image leaves away from the display region of the viewer along with the relative movement of the image to release the fitting into the frame element, and determining each divided image approaches the display region of the viewer along with the relative movement of the image to newly fit the divided image into the frame element. In this case, proper identification information may be attached to the each frame element, and the divided image leaving away from the display region of the viewer may be released the fitting into the frame element, and the divided image approaching the display region of the viewer is newly fitted into the frame element along with the relative movement of the image. Also, proper identification information may be attached to the each frame element, and the viewer may hold the proper identification information associated with the information of the display position of the frame element in the display region of the viewer and the identification information of the divided image fitted into the frame element, and display the divided image fitted into each frame element at the corresponding position in the display region of the viewer, based on the information. Also, the identification information of the divided image may be composed of information corresponding to an address in the entire image, in which the viewer makes a request to the server for the divided image with the identification information of the divided image, and the server discriminates the divided image corresponding to the identification information and transmits it to the viewer. In this case, the identification information of the divided image has no information for identifying a file format of each divided image. Also, the block may be made up of the predetermined number of frame elements as a whole, in which when a relative movement of the image is instructed, the viewer calculates the coordinates of the origin of the block to be moved with respect to the origin of the display region of the viewer, and calculates the coordinates of the origin of the each frame element to be moved, based on the calculated coordinates of the origin of the block, and moves the origin of each frame element to the calculated coordinates to implement the relative movement of the image. Also, the divided image is obtained by dividing the image like a lattice in the transverse direction in which a predetermined number of consecutive divided images in the transverse direction are fitted into the frame elements, the divided image is obtained by dividing the image like a lattice in the longitudinal direction in which a predetermined number of consecutive divided images in the longitudinal direction are fitted into the frame elements, or the divided image is obtained by dividing the image like a lattice in the transverse and longitudinal directions in which a predetermined number of consecutive divided images in the transverse direction, a predetermined number of consecutive divided images in the longitudinal direction, or a predetermined number of divided images in the transverse direction and a predetermined number of divided images in the longitudinal direction are fitted into the frame elements.

Also, the image having the same contents may be transmittable from the server at a plurality of magnifications and by dividing the image into a plurality of areas at each magnification, the image being displayed at a magnification instructed from the viewer by the image display method of the invention. In this case, the number of pixels at which the image is divided in the transverse direction, or the longitudinal direction, or the transverse and longitudinal directions, may be equal irrespective of the magnification. Also, when a magnification change operation is performed by placing a pointer at a position on the image in a state where the image is displayed at one magnification, the image is displayed at the changed magnification with the position on the image where said pointer is located as a steady point.

Also, the image having the same contents may be transmittable from the server at a plurality of magnifications and by dividing the image into a plurality of areas at each magnification, the image being displayed at a magnification instructed from the viewer by the image display method of the invention, in which the number of frame elements is equal, irrespective of the magnification.

Also, this invention provides the image display method, wherein the viewer is a Web browser, each arithmetical operation at the Web browser being executed based on a JavaScript stored in an HTML transmitted from the server. With this method, the image is displayed without the plug-in software. In this case, the frame element may be set up, employing <DIV> tags described in the HTML transmitted from the server. Also, the attribute information such as a file name and/or a file format for the each divided image may not be incorporated into the HTML transmitted from the server.

BRIEF DESCRIPTION OF THE DRAWINGS

FIG. 4 is an HTML source program for making up a block of 6×6 cells into which divided image data is fitted;

FIG. 6 is a view showing an example of the positional relationship between one page of newspaper image, a display region of the browser and the block;

FIG. 8 is a view showing an example of coordinate values of the origin of each cell making up the block;

FIG. 9 is a view showing the coordinate values of each divided image making up one page of newspaper image and the cell number of cell into which each divided image is fitted;

FIG. 10 is a view showing a JavaScript function (excerpt) for acquiring the relationship between the coordinate values of divided image to be fitted into each cell making up the block with the cell number attached to each cell and the display position of each cell on the browser, making a request to the Web server for the corresponding divided image, and fitting divided image transmitted from the Web server in response to the request into each cell;

FIG. 13 is a view showing a JavaScript function for computing the movement amount of block and acquiring the coordinate values of the origin of block to be moved;

FIG. 14 is a view showing an example of change of fitting the divided image into each cell making up the block under a resetting control of the block;

FIG. 15 is a flowchart showing the control of the display magnification change control.

DETAILED DESCRIPTION OF THE PREFERRED EMBODIMENTS

Figure 1:
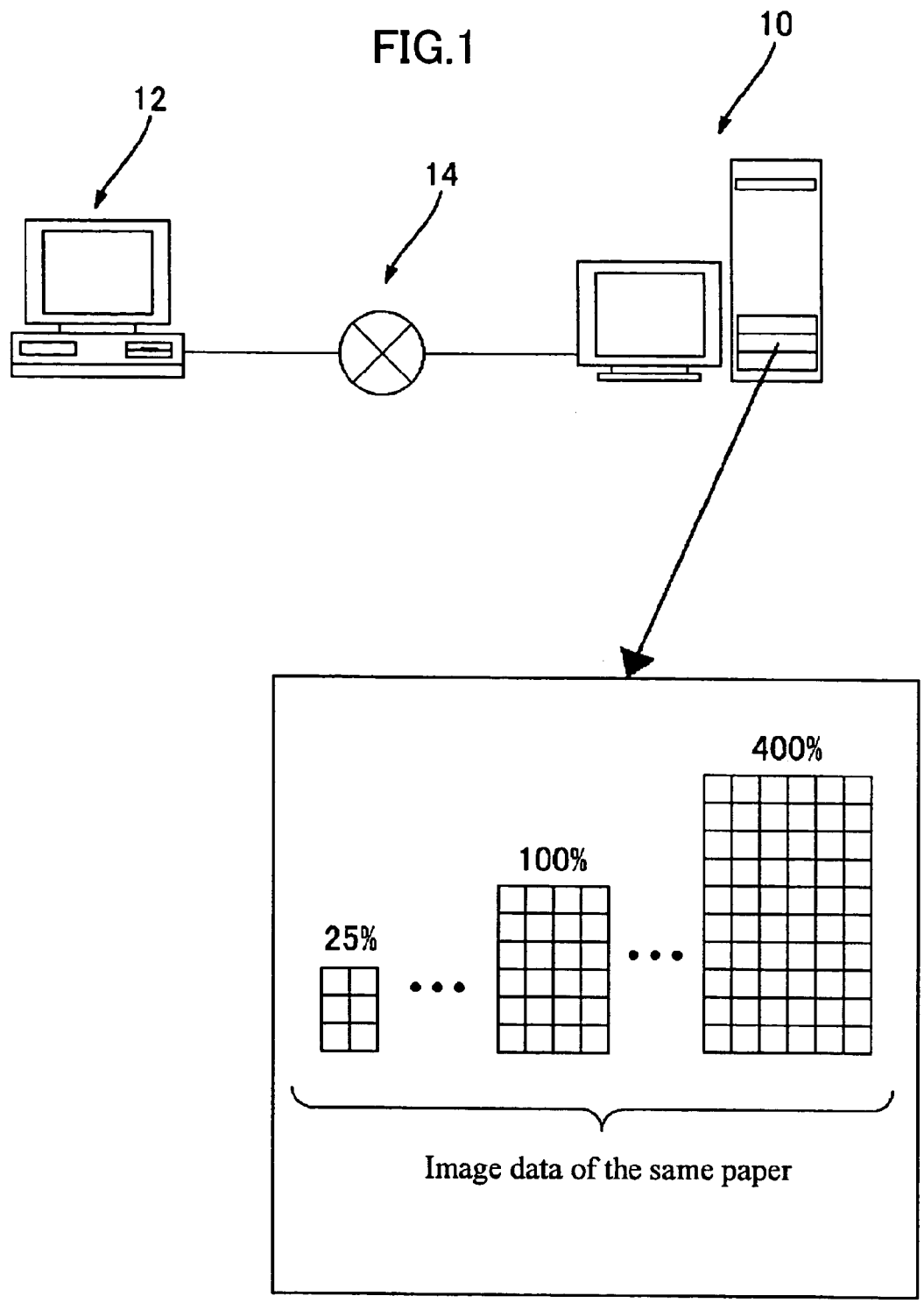
FIG. 1 is a system configuration diagram showing an image display system according to an embodiment of the present invention.

A preferred embodiment of the present invention will be described below. In this embodiment of the invention, a case of distributing and perusing a newspaper image without a plug-in software will be described below. FIG. 1 shows a system configuration. A Web server (server computer) 10 and a Web browser (client computer, viewer) 12 are connected across a communication network 14 such as the Internet. The Web server 10 has an image database storing the newspaper images. This image database has a whole one page of newspaper as one image, in which an image of each page making up the newspaper is stored at various magnifications (length ratio of 25%, 33%, 50% and 67% (reduced images of the actual newspaper), 100% (real images of the actual newspaper), 133%, 200% and 400% (enlarged images of the actual newspaper)) (i.e., the image of same page is stored at multiple magnifications). A file format of each divided image is not necessarily identical, for example, may be a file format of high compression ratio (JPEG format, PNG format, GIF format, etc.) in accordance with the features of each divided image (photograph or letter, color or monochrome). Accordingly, the image of one page of newspaper may be composed of divided images in different file formats. In this way, the transmission time is shortened by employing the file format having high compression ratio for each divided image.

Figure 2:
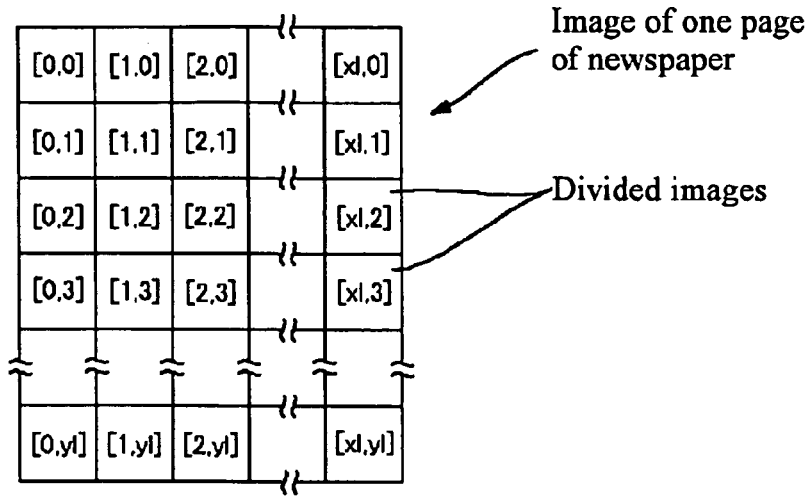
FIG. 2 is an explanatory view showing how to divide the image.

One page of image at one magnification is divided like a lattice from a left upper position (origin position of image) in a transverse direction (X axis direction) and a longitudinal direction (Y axis direction) at every predetermined pixels, and consists of a set of a plurality of square or rectangular divided images, as shown in FIG. 2. The number of pixels making up one divided image is fixed irrespective of a difference in the magnification, for example, 480×480 pixels (when the total number of pixels for one page in the transverse direction is indivisible by the set number of pixels for one divided image in the transverse direction, the number of pixels for the divided image at a right end position is a fraction, and similarly, when the total number of pixels for one page in the longitudinal direction is indivisible by the set number of pixels for one divided image in the longitudinal direction, the number of pixels for the divided image at a lower end position is a fraction). On the contrary, since the number of pixels making up one page of newspaper is varied depending on the magnification (in proportion to the magnification (=length ratio) to the second power), the number of divided images making up one page of newspaper is smaller as the image has lower magnification, or larger as the image has higher magnification. Each divided image has a file name corresponding divided image coordinate values [x, y], which increases one by one toward the right or lower part, where the transverse coordinate is x and the longitudinal coordinate is y, and the divided image position at the left upper corner is an origin [0, 0], as the coordinate values (divided image coordinate values) indicating the position (address) of each divided image in one page of image, as shown in FIG. 2. Assuming that the transverse coordinate value of divided image at the right end in one page of image is $x_1$ and the longitudinal coordinate value of divided image at the lower end is $y_1$, the coordinate values of last divided image at the right lower corner are $[x_1, y_1]$. A particular divided image with a specific magnification at a specific page in a specific newspaper is specified (designated) by the identification information consisting of a combination of newspaper name, morning/evening issue, page number, and divided image coordinate values [x, y]. In perusing the newspaper, if the identification information according to the perusal position indicated by the peruser (reader of the newspaper) is sent from the Web browser 12, the Web server 10 analyzes the identification information, and transmits the corresponding divided images. The Web browser 12 receives the divided images, arranges them in the format of original image, and displays them. If the identification information as above is employed, it is unnecessary to incorporate the file name (data with the identifier (.jpg, .png, .gif) for designating the file format) for each divided image into the HTML (step S2 in FIG. 3 as will be described later) firstly transmitted from the Web server 10 to the Web browser 12 (i.e., the Web browser 12 can request individual divided images, even if it does not know in advance the file name or its file format), whereby the data amount of the HTML is reduced.

In this example, a "block" having the size of encompassing the entire display region of browser is set up on the image, as will be described later (FIG. 6). This block is composed of 6×6 "cells" (frame elements), for example. One cell corresponds to the size of one divided image (e.g., 480×480 pixels), and the divided image at the corresponding position is fitted (assigned) to the cell. The block is moved in a unit of cell in the display region of browser in accordance with the movement of image in the display region of browser so that it always contains the entire display region of browser even when the image is moved (scrolled), while the divided images fitted to the cells are sequentially replaced.

Figure 3:
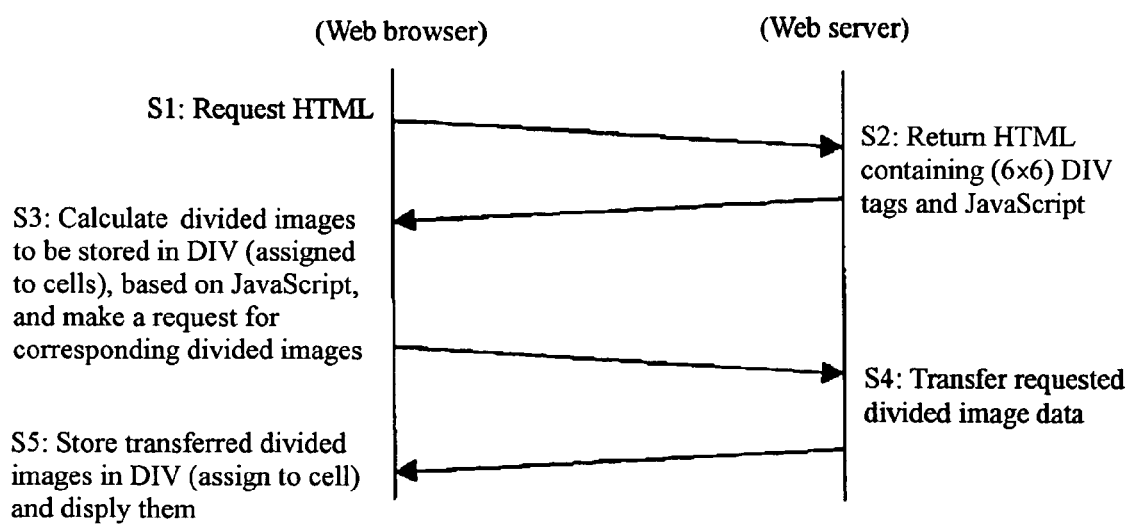
FIG. 3 is a diagram showing the communications between a Web browser 12 and a Web server 10 in perusing the newspaper columns in the system of FIG. 1.

FIG. 3 shows the communications between the Web browser 12 and the Web server 10 in perusing the newspaper. If the peruser makes an instruction of perusing an issue (morning or evening issue) of a specific newspaper on a specific date from the Web browser 12 to the Web server 10, the Web browser makes a request for the HTML of the corresponding contents (S1). The Web server 10 receives this request and returns the corresponding HTML to the Web browser (S2), the HTML including a <DIV> tag for setting up 6×6 cells for fitting the divided image data, and JavaScript for calculating which divided image is fitted into which cell and displayed at which position on the browser, as shown in FIG. 4. Each of 6×6 cells is entitled with the name "canvas0000" to "canvas0505", as shown in FIG. 4. Of the four digit number following "canvas", the first two digits indicate the address (00 to 05) of cell in the X axis direction within the block, and the ensuing two digits indicate the address (00 to 05) of cell in the Y axis direction within the block.

Figure 5:
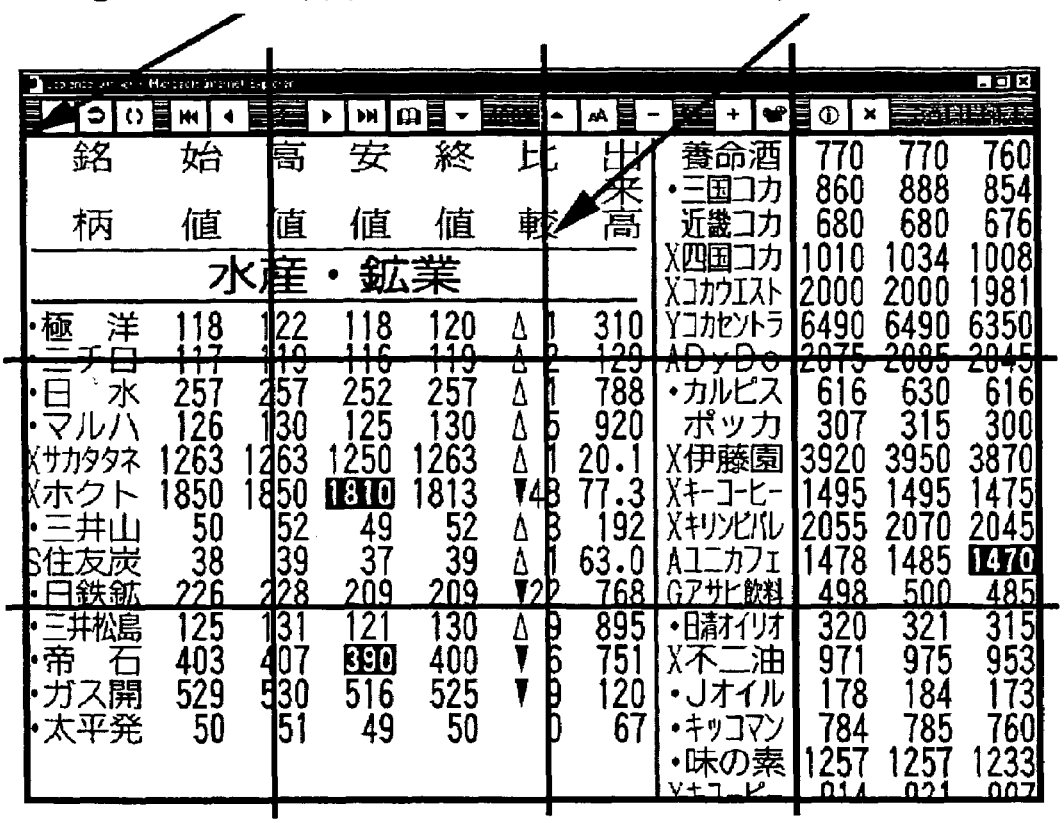
FIG. 5 is a view showing an example of a newspaper image displayed on the Web browser 12 of FIG. 1.

The Web browser 12 receives the HTML, and calculates which divided image is assigned to which cell, and at which position on the browser 12 the divided image fitted into each cell is displayed based on JavaScript described in the HTML. And it is determined whether or not the calculated divided image is already downloaded into the Web browser 12, and saved in a cache memory, and if the divided image is already saved, the divided image is read and fitted into the corresponding cell. Also, for the divided images not saved in the Web browser 12, a request to the Web server for the corresponding divided images is issued (S3). The Web server 10 transmits the corresponding divided image data in response to the request (S4). The Web browser 12 receives the divided image data, and fits it into the corresponding cell. In this way, the divided image is fitted into (associated with) each of 6×6 cells and displayed at the calculated position (S5). Thereby, the divided images are displayed without joint on the entire display region of the Web browser 12, whereby the newspaper image is displayed. One example of display is shown in FIG. 5 (the boundary line of cell is imaginary, and not displayed on the actual screen). At the early time of perusal, an initial screen is displayed, in which the HTML transmitted from the Web server 10 is described to enable the Web browser 12 to make a request to the Web server 10 for the divided image at a predetermined magnification (relatively low magnification to overlook the entire article of newspaper) at the first page of newspaper which is instructed to peruse from the Web browser 12.

〔Initial Display Control〕

The divided image fitted into each cell making up the block will be described below. Herein, an image 18 (corresponding to one page of newspaper) larger than a display region 16 of the browser is initially displayed in a state where the center of the display region 16 of the browser is coincident with the center of the image 18, as shown in FIG. 6. Also, the block 20 is composed of 6×6 cells 22, with a space of one cell on the left side and the upper side of the block 20 (i.e., the left upper corner of the display region 16 of the browser is in the cell located at the second place of the block 20 from the left side and the second place from the upper side). In the following description, the coordinate values or the number (address) is classified according to the kind and designated as below.

( , ): pixel coordinate values (coordinate values in a unit of pixel)

[ , ]: divided image coordinate values (number value for each divided image over the entire image)

〔 , 〕: cell number (number value for each cell in the block)

The pixel coordinate values where the origin (left upper corner) of the browser is the origin (0,0), the polarity in the X axis direction is + in the right direction and − in the left direction, while the polarity in the Y direction is + in the lower direction and − in the upper direction.

In FIG. 6, the variables have the following meanings.

$X_i$: width (pixel value) of entire image (one page of newspaper)

$Y_i$: height (pixel value) of entire image (one page of newspaper)

$X_b$: width of browser (pixel value)

$Y_b$: height of browser (pixel value)

$X_1 = X_i/2$: half value of image width (Expression 1)

$Y_1 = Y_i/2$: half value of image height (Expression 2)

$X_2 = X_b/2$: half value of browser width (Expression 3)

$Y_2 = Y_b/2$: half value of browser height (Expression 4)

The width $X_i$ and height $Y_i$ of the entire image are buried as the attribute values of a hidden tag into the HTML to be transmitted by the Web server (step S2 in FIG. 3), and given to the Web browser. An example of this hidden tag is shown below.

<INPUT TYPE="hidden" NAME="imageWidth" VALUE="5986">

<INPUT TYPE="hidden" NAME="imageHeight" VALUE="8130">

In this example, the width $X_i$=5986 (pixels) and height $Y_i$=8130 (pixels) are given. Also, the width $X_b$ and height $Y_b$ of the browser are acquired by the browser itself based on JavaScript described in the HTML (step S2 in FIG. 3) transmitted from the Web server. The width $X_b$ and height $Y_b$ of the browser are acquired by the following functions of JavaScript.

browserWidth=document.body.clientWidth; //width of browser in display browserHeight=document.body.clientHeight; //height of browser in display In FIG. 6, assuming that the origin (left upper corner) of the browser is the origin (0, 0), the coordinate values ($X_o$, $Y_o$) of the origin of image are given by the following expressions.

$X_o = X_2 - X_1$: X axis origin of image (Expression 5)

$Y_o = Y_2 - Y_1$: Y axis origin of image (Expression 6)

Assuming that the size of one divided image (=size of one cell) is 480×480 pixels, the numbers of divided images over the entire image are given by the following expressions.

$G_{xi} = X_i/480$: total number of divided images in the X axis direction (Expression 7)

$G_{yi} = Y_i/480$: total number of divided images in the Y axis direction (Expression 8)

When the $G_{xi}$ and $G_{yi}$ have a decimal place, the integer value raised to a unit is the total number of divided images in the X axis or Y axis direction. Also, the value of $G_{xi}$ by omitting the decimal fractions is the transverse coordinate value $x_1$ of the divided image at the right end (FIG. 2), and the value of $G_{yi}$ by omitting the decimal fractions is the longitudinal coordinate value $y_1$ of the divided image at the lower end (FIG. 2).

On the other hand, the number of divided images required for the display region 16 of the browser is given by the following expression.

$G_{xb} = X_b/480$: number of divided images required for the display in the X axis direction (Expression 9)

$G_{yb} = Y_b/480$: number of divided images required for the display in the Y axis direction (Expression 10)

The coordinates [$x_f$, $y_f$] of the first divided image (divided image which the origin (0, 0) of the browser belongs to (located at)) entering the display region 16 of the browser are given by the following expressions.

$x_f$=−(value of quotient ($X_o$/480) by omitting decimal fractions) (Expression 11)

$y_f$=−(value of quotient ($Y_o$/480) by omitting decimal fractions) (Expression 12)

The divided image having the divided image coordinate value $x_f$−1 in the X axis direction is fitted into the cell (of which the cell number in the X axis direction is $S_{xf}$, hereinafter referred to as "X axis first cell") located at the left end of the block. Similarly, the divided image having the divided image coordinate value $y_f-1$ in the Y axis direction is fitted into the cell (of which the cell number in the Y axis direction is $S_{yf}$, hereinafter referred to as "Y axis first cell") located at the upper end of the block. That is, $$S_{xf}=x_f-1 \quad \text{(Expression 13)}$$

$$S_{yf}=y_f-1 \quad \text{(Expression 14)}$$

Figure 7A:
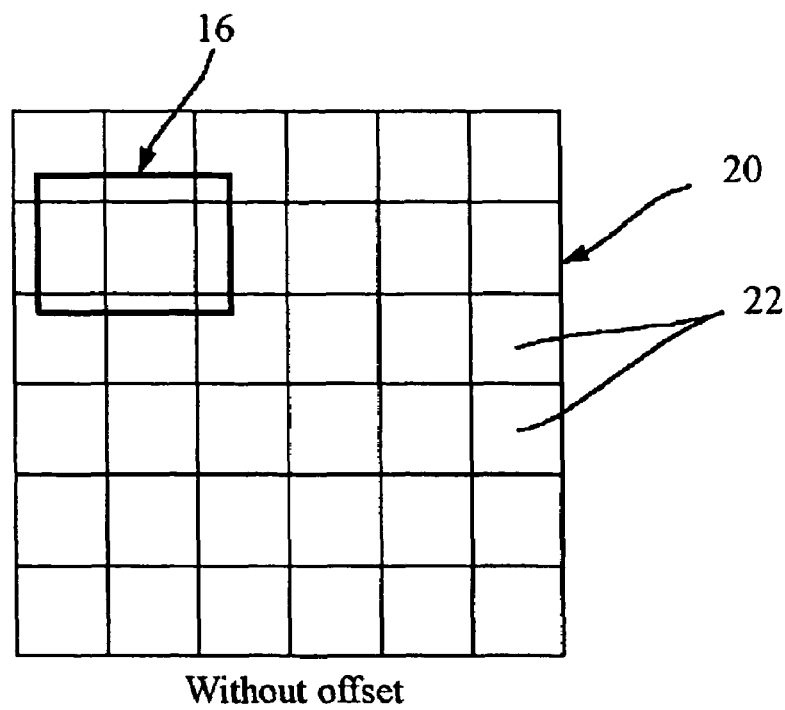
FIG. 7 is a view showing the relationship between the block and the display region of the browser, wherein 7A is a case without offset, and 7B is a case with offset as large as −1 cell.
Figure 7B:
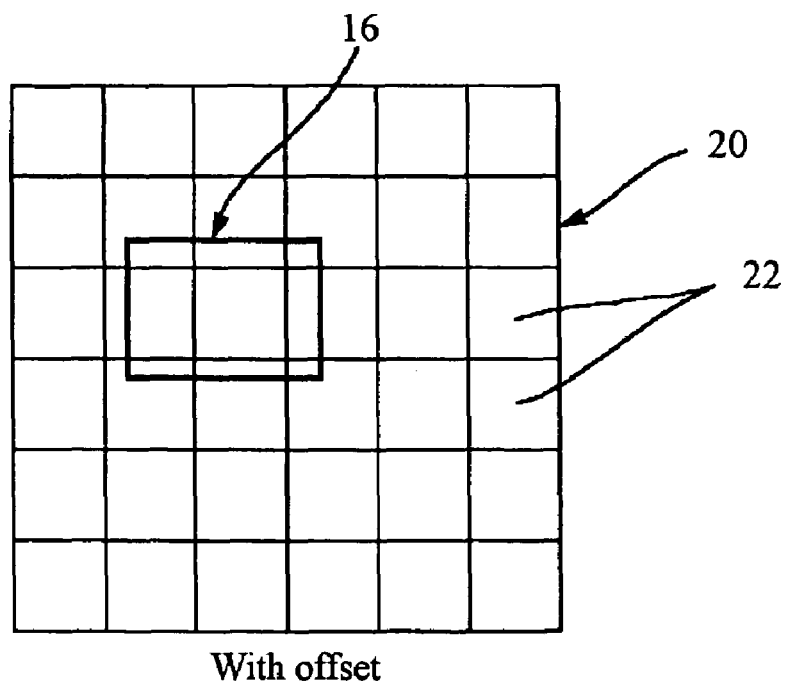

Thereby, the divided image $[x_f-1, y_f-1]$ is fitted into the first cell $(S_{xf}, S_{yf})$ of the block (cell located at the left upper corner of block, hereinafter referred to as the "first cell"). The reason for addition of $-1$ is as follows. If setting $S_{xf}=x_f$ and $S_{yf}=y_f$, the left end and upper end parts of the block 20 are disposed closer to the left end and upper end parts of the display region 16 of the browser, and in moving (scrolling) the image in the right lower direction, the blank portion (where the image is not displayed) is likely to occur in the left end and upper end parts of the display region 16 of the browser in a latency time for which the divided image to afresh enter the display region 16 of the browser from the left and upper sides is transferred newly from the Web server, as shown in FIG. 7A. In contrast, by adding $-1$, the block 20 is offset by one cell or more to the left and upper direction in the display region 16 of the browser, and in moving the image in the right lower direction, the blank portion is less likely to occur in the left end and upper end parts of the display region 16 of the browser, as shown in FIG. 7B.

The coordinates of the divided image fitted into other cells making up the block are obtained by successively adding $+1$ to the coordinates $[x_f-1, y_f-1]$ of divided image fitted into the first cell $(S_{xf}, S_{yf})$ in the X axis direction and the Y axis direction. That is, supposing that the first cell $(S_{xf}, S_{yf})$ is the zeroth cell, the coordinate values of the divided image fitted into the cell $(S_{xn}, S_{yn})$ at the m-th (m=0, 1, . . . , 5) place in the X axis direction and the n-th (n=0, 1, . . . , 5) place in the Y axis direction are given such that $$S_{xn}=S_{xf}+m=x_f-1+m \quad \text{(Expression 15)}$$

$$S_{yn}=S_{yf}+n=y_f-1+n \quad \text{(Expression 16)}$$

Accordingly, the coordinate values of the divided image fitted into the last cell $(S_{x1}, S_{y1})$ of the block (cell located at the right lower corner of the block, hereinafter referred to as the "last cell". The cells located at the right end of the block are referred to as the "X axis last cell" respectively and the cells located at the lower end of the block are referred to as the "Y axis last cell" respectively) are given such that, $$S_{xi}=S_{xf}+5=x_f+4 \quad \text{(Expression 17)}$$

$$S_{yi}=S_{yf}+5=y_f+4 \quad \text{(Expression 18)}$$

In this way, the coordinates of the divided images fitted into the 6×6 cells 22 making up the block 20 are obtained.

Next, the display positions of the 6×6 cells 22 making up the block 20 on the browser will be described below. The display position of each cell on the browser is specified (designated) by the coordinate values (pixel values) of the origin (at the left upper corner) of each cell. The coordinate values of the origin of each cell are obtained in the following way. First of all, the origin $(X_{bo}, Y_{bo})$ of the first cell $(S_{xf}, S_{yf})$ corresponds to the origin of the block (see FIG. 6), and are given such that, $$X_{bo}=X_o+(S_{xf}\times480) \quad \text{(Expression 19)}$$

$$Y_{bo}=Y_o+(S_{yf}\times480) \quad \text{(Expression 20)}$$

The coordinates of the origin of other cells making up the block are obtained by successively adding 480 to the origin $(X_{bo}, Y_{bo})$ of the first cell $(S_{xf}, S_{yf})$ obtained in this way in the X axis direction and the Y axis direction. That is, supposing that the first cell $(S_{xf}, S_{yf})$ is the zeroth cell, the origin $(X_{bn}, Y_{bn})$ of the cell $(S_{xn}, S_{yn})$ at the m-th (m=0, 1, . . . , 5) place in the X axis direction and the n-th (n=0, 1, . . . , 5) place in the Y axis direction are given such that $$X_{bn}=X_{bo}+(m\times480) \quad \text{(Expression 21)}$$

$$Y_{bn}=Y_{bo}+(n\times480) \quad \text{(Expression 22)}$$

The HTML t,919ransmitted from the Web server (step S2 in FIG. 3) has a description of JavaScript for performing the arithmetical operations of the above expressions (1) to (22). When the Web browser receives the HTML, the coordinate values of the divided images fitted into the 6×6 cells making up the block, and the display position of each cell (pixel coordinate position at which the origin position of each cell is displayed) on the browser are calculated, based on the description of JavaScript. And the Web browser makes a request to the Web server for the corresponding divided image, using the calculated coordinate values of the divided images as the identification information (the divided image already downloaded from the Web server and saved in the cache memory is directly employed) (step S3 in FIG. 3). The Web server 10 transmits the corresponding divided image data, in response to the request (step S4), and the Web browser 12 receives the divided image data, and displays the divided image fitted into the corresponding cell at the calculated position (step S5).

Herein, the coordinate values of the divided image fitted into each cell and the display position of each cell on the browser, that are obtained by putting the actual values into the expressions (1) to (22) are confirmed. Supposing that the size of the image is 5986 pixels in the X axis direction and 8130 pixels in the Y axis direction, and the width of browser is 1020 pixels in the X axis direction and 556 pixels in the Y axis direction, $X_i$=5986, $Y_i$=8130, $X_b$=1020 and $Y_b$=556 are obtained. From the expressions (1) and (2), the width half value $X_1$ of divided image and the height half value $Y_1$ of divided image are given such that $$X_1=5986/2=2993$$

$$Y_1=8130/2=4065$$

Also, from the expressions (3) and (4), the width half value $X_2$ of browser and the height half value $Y_2$ of browser are given such that $$X_2=1020/2=510$$

$$Y_2=556/2=278$$

Also, from the expressions (5) and (6), the origin $(X_o, Y_o)$ of image are given such that $$X_o=510-2993=-2483$$

$$Y_o=278-4065=-3787$$

Supposing that the size of one divided image is 480×480 pixels, from the expressions (7) and (8), the numbers of divided images in the entire image are given such that, $$G_{xi} = 5986/480 = 12.4708$$

$$G_{yi} = 8130/480 = 16.9375$$

The numerical values of $G_{xi}=12.4708$ and $G_{yi}=16.9375$ indicate that the number of divided images in the entire image is 13 in the X axis direction and 17 in the Y axis direction, and 13×17=221 as a whole. Also, the value of $G_{xi}$ by omitting the decimal fractions is the coordinate value $x_1$ of the divided image at the right end in the transverse direction, and the value of $G_{yi}$ by omitting the decimal fractions is the coordinate value $y_1$ of the divided image at the lower end in the longitudinal direction. That is, $x_1=12$ and $y_1=16$.

From the expressions (9) and (10), the numbers of divided image required for the display region of browser are given such that $$G_{xb} = 1020/480 = 2.125$$

$$G_{yb} = 556/480 = 1.15833$$

The numerical values of $G_{xb}=2.125$ and $G_{yb}=1.15833$ indicate that at least four cells making up the block in the X axis direction and at least three cells in the Y axis direction are required to display the image on the entire display region of browser. In this example, in order that the blank portion (where no image is displayed) is less likely to occur when the image is moved (scrolled), the block is made of six cells in the X axis direction and six cells in the Y axis direction, that is 6×6=36 cells in total. If the number of cells making up the block is increased, the blank portion is less likely to occur in the movement operation of the image. On the contrary, it takes a lot of time to calculate the coordinates of each cell in the movement operation of the image, possibly making the moving speed slower (due to capability of the CPU). Thereby, to prevent the blank portion from occurring in the movement operation, the number of cells making up the block is set up, based on the moving speed of image.

From the expressions (11) and (12), the coordinates $[x_f, y_f]$ of the first divided image entering the display region of browser are given such that $x_f$=(value of quotient (−2483/480) by omitting decimal fractions)=5

$y_f$=(value of quotient (−3787/480) by omitting decimal fractions)=7

Accordingly, from the expressions (13) and (14), the coordinates of the divided image fitted into the first cell $[S_{xf}, S_{yf}]$ of the block are given such that, $$S_{xf} = 5-1 = 4$$

$$S_{yf} = 7-1 = 6$$

Coordinates applied to the last cell $[S_{x1}, S_{y1}]$ of the block according to the equations (17) and (18), $$S_{x1} = S_{xf} + 5 = 9$$

$$S_{y1} = S_{yf} + 5 = 11$$

From the expressions (19) and (20), the origin $(X_{bo}, Y_{bo})$ of the first cell $[S_{xf}, S_{yf}]$ are given such that $$X_{bo} = -2483 + (4 \times 480) = -563$$

$$Y_{bo} = -3787 + (6 \times 480) = -907$$

FIG. 8 shows the coordinate values of the origin of each cell obtained from the expressions (21) and (22) based on the coordinates $(X_{bo}, Y_{bo})$ of the first cell.

Herein, a way of attaching the cell number of each cell 22 making up the block 20 will be described below. The attaching of cell number is performed based on the JavaScript described in the HTML transmitted from the Web server. The cell number $[S_x, S_y]$ of each cell is the residues of the coordinates [x, y] of divided image fitted into each cell, which are divided by the total number of cells in the X axis direction making up the block in the X axis direction and the total number of cells in the Y axis direction making up the block in the Y axis direction. With this method, the cell number (assigned to each divided image) of the cell, into which each divided image is fitted, is uniquely determined for each divided image. In this example, since the total number of cells is 6 in the X axis direction and the Y axis direction, the cell number is a repetition of 0, 1, 2, . . . , 5 in the X axis direction and Y axis direction. In this case, the cell number of cell, into which each divided image is fitted, is shown in FIG. 9. Of the numerical values described at the position of each divided image in FIG. 9, the coordinate values of each divided image 24 are indicated at the upper stage and the cell number of cell fitted is indicated at the lower stage. Although the cell number is repetitively used, the number of cells within the block is only 6×6, whereby the same cell number is not duplicately used within the block at the same time. By repetitively using the cell number in this way, it is sufficient if the 6×6 <DIV> tags are prepared to set up the cells described in the HTML, as shown in FIG. 4.

In the above way, the coordinate values of each divided image 24 fitted into the 6×6 cells 22 making up the block 20, the cell number of each cell 22, and the display position of each cell (pixel coordinate position to display the origin position of each cell) on the browser are obtained, based on JavaScript described in the HTML transmitted from the Web server. Then, the Web browser makes a request to the Web server to transmit the corresponding divided image 24 (step S3 in FIG. 3). In response to this request, the divided image data is transmitted from the Web server (step S4). Then, the divided image is fitted into the cell of corresponding cell number and displayed on the browser (step S5). In this way, the divided images 24 are displayed without joint on the entire display region of the Web browser 12, so that the newspaper image 18 appears.

FIG. 10 is a view showing a JavaScript function (excerpt) for acquiring the relationship between the coordinate values of divided image 24 to be fitted into each cell 22 making up the block 20 with the cell number attached to each cell 22 and the display position (origin position of each cell) on the browser of each cell 22, making a request to the Web server for the corresponding divided image, and fitting divided image 24 transmitted in response to the request from the Web server into each cell 22. This JavaScript function determines whether or not the divided image is contained in the block by scanning the divided image in the Y axis direction, with the divided image [0, 0] at the left upper corner of image as the starting point, in which if any divided image is contained in the block, the cell number sellX in the X axis direction and the cell number sellY in the Y axis direction are attached to the cell into which the divided image is fitted, in which the cell number sellX in the X axis direction is the residue of the coordinate value x of the divided image in the X axis direction divided by 6, and the cell number sellY in the Y axis direction is the residue of the coordinate value y of the divided image in the Y axis direction divided by 6. And with "document.all ("canvas"+sellX+sellY).innerHTML="<IMG ID= 'image'"+x+y+"' SRC='image.cgi? a=xxx&b=xxx&c=xxx&d= xxx&e=xxx&f=xxx&g=xxx' STYLE='left:"+originX+";top:"+originY+";'>";", a request for the corresponding divided image is made to the Web server, and the divided image transmitted from the Web server in response to this request is fitted into the corresponding cell. The JavaScript function transforms the DIV tag (see FIG. 4) having the ID of "canvas sellX sellY" (sellX=00 to 05, sellY=00 to 05) into the IMG tag having the ID of the coordinate values "image x y" of the divided image fitted into the cell, and buries the divided image data from "image.cgi" (image data retrieval and transfer module on the Web server side) as the source of the IMG tag. At this time, "a=xxx&b=xxx&c=xxx&d=xxx&e=xxx&f=xxx&g=xxx" as the parameter (newspaper name, date, morning/evening issue, page number, magnification, etc.) for specifying the image stored in the Web server has the value for retrieving the specific image file. "STYLE='left:"+originX+";top:"+originY+";'" indicates the coordinate position (pixel position) on the display region of browser for displaying the origin (at the left upper position) of this cell (divided image).

If the above processing is performed up to the last divided image in the Y axis direction, the operation transfers to its right adjacent column. It is similarly determined whether or not any divided image is contained in the block from the upper end, in which the cell number sellX in the X axis direction and the cell number sellY in the Y axis direction are attached to the cell into which the divided image contained in the block is fitted. And if the processing reaches the last divided image at the last column in the X axis direction, the processing is ended.

[Scroll Processing]

Figure 11:
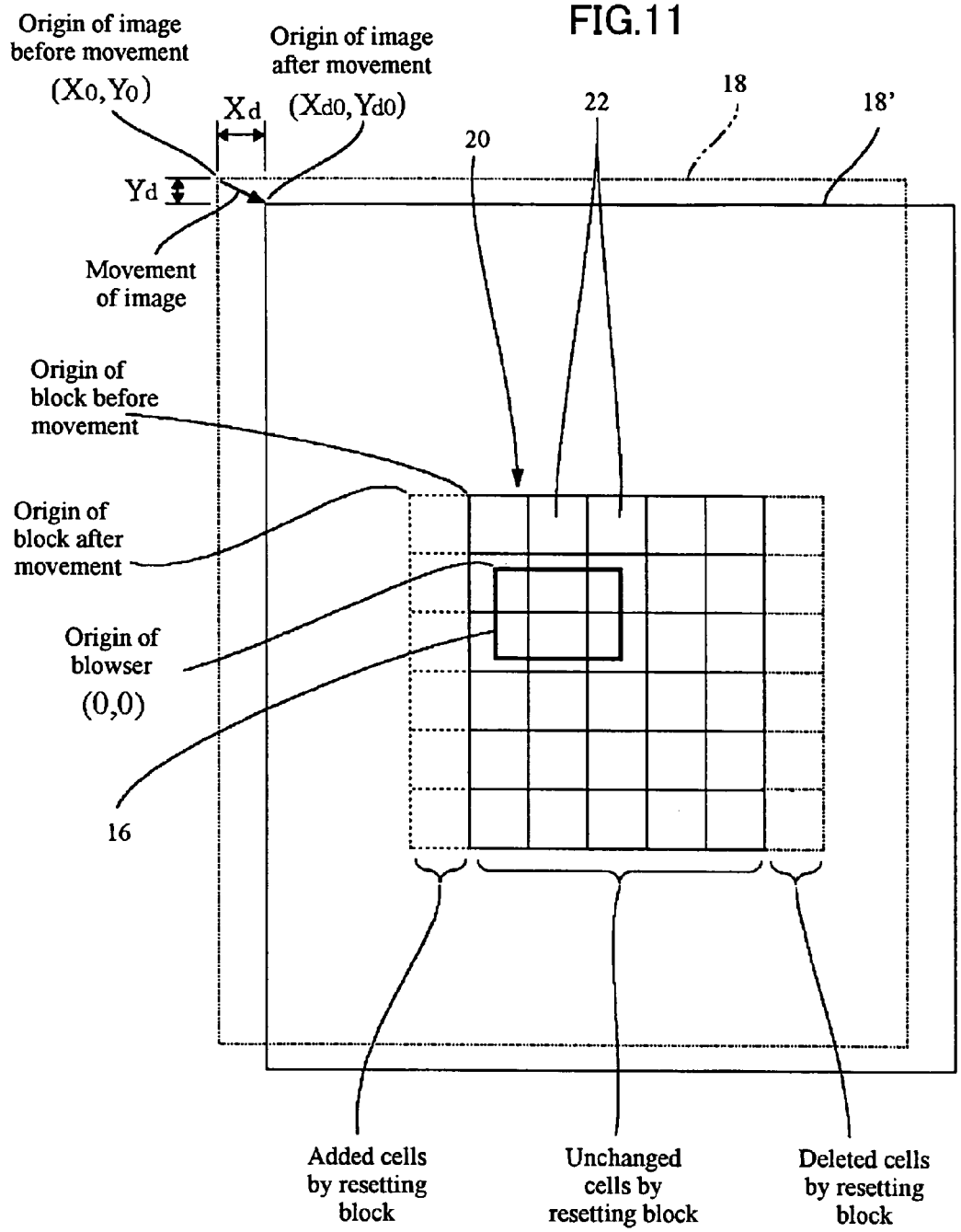
FIG. 11 is a view showing an example of a movement operation of the image by the scroll operation.

A method for moving the image to any position on the display screen of browser (i.e., moving the perusal position) by a scroll operation of the peruser after the initial display is made in the above way will be described below. FIG. 11 shows the operation for moving the image by scroll operation. In FIG. 11, the image 18 is moved by $X_d$ (pixel value) to the right in the X axis direction and moved by $Y_d$ (pixel value) to the left in the Y axis direction (the image position after movement is indicated by numeral 18'). Since the block 20 is moved together with the image 18, the block 20 is moved relatively to the display region 16 of browser by this movement, whereby the block 20 gets out of the display region 16 of browser in any case if there is no treatment. Thus, the position of the block 20 with respect to the image 18 is changed in accordance with the amount of movement, and the control for updating the fitting of the divided image into each cell 22 making up the block 20 (resetting the block) is made accordingly. By the resetting of the block, the block 20 is controlled to include the entire display region 16 of browser at any time (so that the entire display region 16 of browser is contained within the block 20). In an example of FIG. 11, the block 20 is moved relatively to the right in the display region 16 of browser by scroll operation, and because one boundary line of the cell is beyond the origin of browser, one column of cells at the right end are deleted by resetting the block, and therefore one column of cells are added to the left end. The intermediate five columns of cells are not changed.

Figure 12:
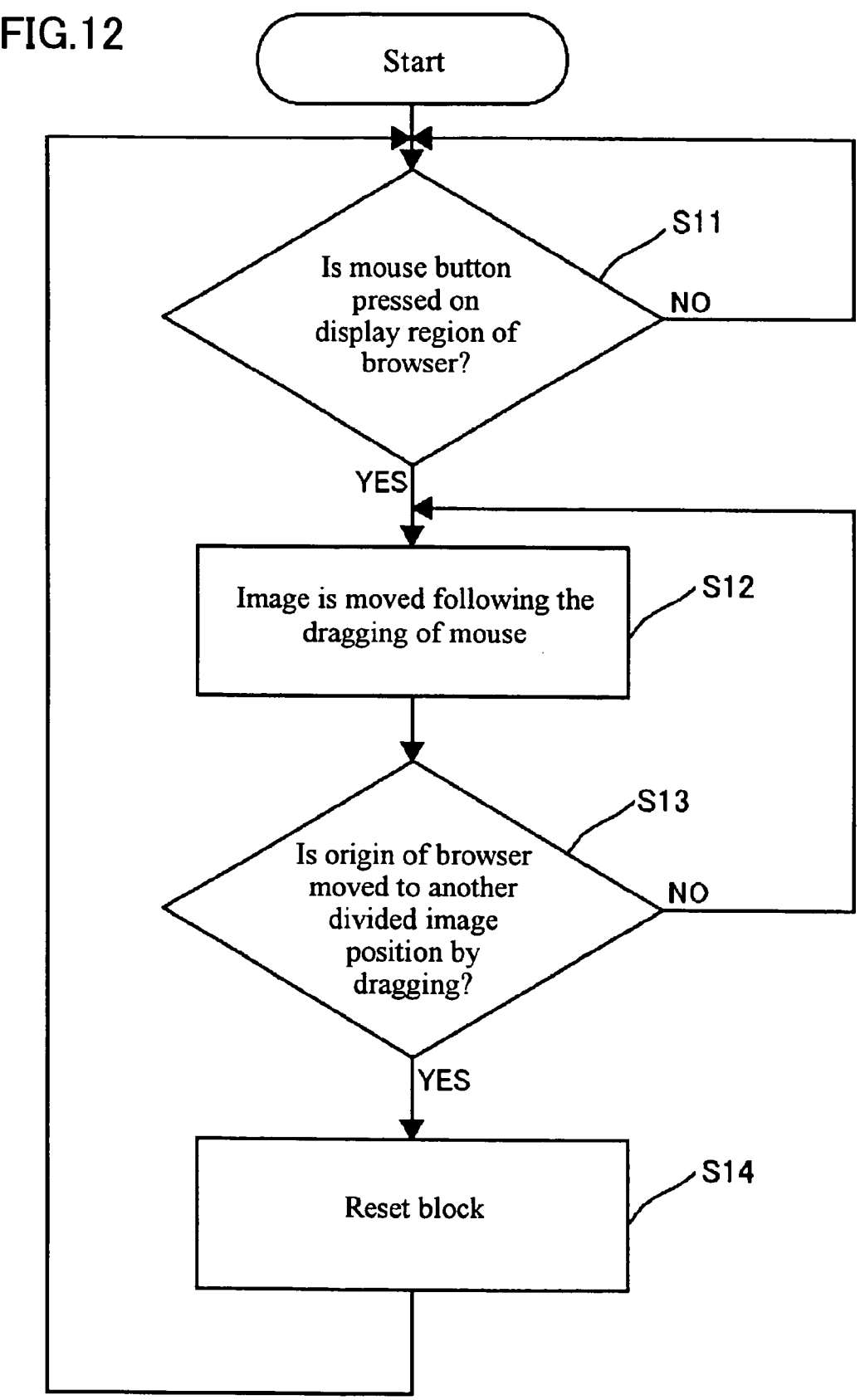
FIG. 12 is a flowchart showing the control contents in making the scroll operation.

FIG. 12 shows a control flow of the scroll operation. The control of FIG. 12 is made with JavaScript described in the HTML transmitted from the Web server. The control of the scroll operation includes the control for moving the image and the control for resetting the block. To begin with, the movement control of the image will be described. A mouse cursor (pointer) is located at any position on the screen where the newspaper image is displayed, and a mouse left button is pressed (mouse down operation) (step S11 in FIG. 12). If the mouse cursor is moved (drag operation) while the mouse left button is being pressed, the image is moved following the mouse cursor (step S12). In this case, if the movement amount is calculated in a unit of cell, it takes a lot of time to perform the calculation, making the movement operation slower. Thus, like the HTML of FIG. 4, the entire <DIG> tag for setting the 6×6 cells is bundles as one block by the <DIV> tag with the name of canvas BLOCK, and the movement amount for one block is calculated to acquire the origin after movement of the block. Based on the obtained coordinates of the origin of the block, the coordinates of the origin of each cell making up the block are calculated. With this method, the relative position of the origin of each cell to the origin of the block is predetermined, and calculated by a simple arithmetical operation. On the other hand, the movement amount requiring the complex calculation is only obtained for one block, so that the calculation amount is smaller on the whole than the movement amount is calculated in a unit of cell (for each cell), making the movement operation faster.

FIG. 13 shows a JavaScript function for calculating the movement amount (=movement amount of the mouse cursor) of the block (image) and acquiring the coordinates of the origin of the block to be moved. If the coordinates of the origin of the block to be moved are acquired employing this function, this coordinates are the coordinates of the origin of the first cell $(S_{xf}, S_{yf})$ in the block, and the coordinates of the origin of other cells are acquired by successively adding 480 in the X axis direction and the Y axis direction. This calculation is repeated while the mouse cursor is being moved, whereby the image is moved following the mouse cursor. If the mouse button is released (mouse up operation) after the mouse cursor is moved to any position, the image is stopped at that position.

Then, a resetting control of the block will be described below. If the drag operation is ended, and the mouse up operation is performed, the cell position (divided image position) to which the origin (0, 0) of the browser on the image after movement belongs is judged, and it is determined whether or not the cell position is changed from the position before dragging (i.e., the origin (0, 0) of the browser is beyond the boundary of the cell.) (step S13 in FIG. 12). And if changed (beyond the cell boundary), the block position is moved in the same direction as the movement of the image by the changed amount (number of lines beyond the cell boundary), and the block is reset by updating the fitting of divided image into each cell making up the block (step S14).

The resetting control of the block is implemented by the following arithmetical operation. Supposing that the movement amount of image by the dragging operation is $X_d$ to the right side in the X axis direction and $Y_d$ to the lower side in the Y axis direction (the movement amount of image $X_d$ and $Y_d$ is obtained by subtracting the coordinate values of mouse cursor at the drag start position (mouse down operation position) from the coordinate values of mouse cursor at the drag end position (mouse up operation position), as shown in FIG. 11, the coordinate values $(X_{do}, Y_{do})$ of the origin of image after movement are given by the following expressions.

$X_{do}=X_{fo}+X_d$: X axis origin of image after movement (Expression 23)

$Y_{do}=Y_{fo}+Y_d$: Y axis origin of image after movement (Expression 24)

$X_{fo}$: final X axis origin of image by the previous scroll operation. At the first scroll operation, $X_{fo}=X_o$ (X axis origin at the initial display)

$Y_{fo}$: final Y axis origin of image by the previous scroll operation. At the first scroll operation, $Y_{fo}=Y_o$ (Y axis origin at the initial display)

Also, the coordinates [$x_{df}, y_{df}$] of the first divided image (to which the origin (0, 0) of browser belongs) entering the display region of browser after movement are given by the following expressions.

$x_{df}$=–(value of quotient ($X_{do}$/480) by omitting decimal fractions) (Expression 25)

$y_{df}$=–(value of quotient ($Y_{do}$/480) by omitting decimal fractions) (Expression 26)

Accordingly, the numbers $S_{xd}$ and $S_{yd}$ by which the boundary of cell is beyond the origin (0, 0) of browser by dragging are given by the following expressions.

$S_{xd}=x_{fo}-x_{df}$ (Expression 27)

$S_{yd}=y_{fo}-y_{df}$ (Expression 28)

Where $x_{fo}$: X axis coordinates of the first divided image entering the display region of browser at the previous time of resetting the block $y_{fo}$: Y axis coordinates of the first divided image entering the display region of browser at the previous time of resetting the block If $S_{xd}$ obtained by the expression 27 is zero, the cell boundary is not beyond the origin (0, 0) of the browser in the X axis direction. If it is + value, the boundaries of cells as many as the number of + value are beyond the origin (0, 0) of browser to the right side. If it is – value, the boundaries of cells as many as the number of – value are beyond the origin (0, 0) of browser to the left side. Also, if $S_{yd}$ obtained by the expression 28 is zero, the cell boundary is not beyond the origin (0, 0) of the browser in the Y axis direction. If it is + value, the boundaries of cells as many as the number of + value are beyond the origin (0, 0) of browser to the lower side. If it is – value, the boundaries of cells as many as the number of – value are beyond the origin (0, 0) of browser to the upper side.

If $S_{xd}$ and $S_{yd}$ are both zero as a result of the calculation according to the expressions (27) and (28), the position of the divided image to which the origin (0, 0) of browser belongs is not changed before and after dragging, whereby the resetting of the block is not performed. On the contrary, if at least one of $S_{xd}$ and $S_{yd}$ is other than zero as a result of the calculation according to the expressions (27) and (28), the position of the divided image to which the origin (0, 0) of browser belongs is changed before and after dragging, whereby the resetting of the block is performed.

The resetting of the block is implemented by moving the entire block relative to the image in the direction opposite to the movement direction of image by the number of cells corresponding to $S_{xd}$ and $S_{yd}$. By resetting the block, the following divided image is fitted into each cell making up the block. The divided image with the coordinate value of divided image in the X axis direction being $x_{df}-1$ is fitted into the cell (X axis first cell) $S_{xdf}$ located at the left end of block. Similarly, the divided image with the coordinate value of divided image in the Y axis direction being $y_{df}-1$ is fitted into the cell (Y axis first cell) $S_{ydf}$ located at the upper end of block. That is, $S_{xdf}=x_{df}-1$ (Expression 29)

$S_{ydf}=y_{df}-1$ (Expression 30)

With the above expressions, the divided image [$x_{df}-1, y_{df}-1$] is fitted into the cell (first cell) ($S_{xdf}, S_{ydf}$) located at the left upper corner of block after resetting. Addition of –1 has the same purpose as addition of –1 in the expressions (13) and (14). That is, if the block is offset by one cell or more to the left or the upper direction in the display region of the browser, when the image is moved in the right lower direction, the blank portion is less likely to occur in the left end part and the upper end part of the display region of the browser.

The coordinates of the divided image fitted into other cells making up the block are obtained by successively adding +1 to the coordinates [$x_{df}-1, y_{df}-1$] of divided image fitted into the first cell ($S_{xdf}, S_{ydf}$) in the X axis direction and the Y axis direction. That is, supposing that the first cell ($S_{xdf}, S_{ydf}$) is the zeroth cell, the coordinate values of the divided image fitted into the cell ($S_{xdn}, S_{ydn}$) at the m-th (m=0, 1, . . . , 5) place in the X axis direction and the n-th (n=0, 1, . . . , 5) place in the Y axis direction are given such that $S_{xdn}=S_{xdf}+m=x_{df}-1+m$ (Expression 31)

$S_{ydn}=S_{ydf}+n=y_{df}-1+n$ (Expression 32)

Accordingly, the coordinate values of the divided image fitted into the cell (last cell) ($S_{xd1}, S_{yd1}$) located at the right lower corner of the block are given such that, $S_{xd1}=S_{xdf}+5=x_f+4$ (Expression 33)

$S_{yd1}=S_{ydf}+5=y_f+4$ (Expression 34)

In this way, the divided images fitted into the 6×6 cells 22 making up the reset block are obtained. If the divided images fitted into the 6×6 cells are obtained, a request to the Web server is made for the divided image afresh entering the block area, when not acquired yet, or the divided image already downloaded from the Web server and saved in the cache memory is read, whereby the divided image is fitted into the corresponding cell and displayed. As shown in FIG. 9, the cell number (assigned to each divided image) of the cell, into which each divided image is fitted, is uniquely determined for each divided image. The cell number is not changed for the divided image remaining within the block (not getting out of the block by the scroll operation) from the previous time of resetting the block.

FIG. 14 shows one example of changing the fitting of divided image into each cell making up the block under the resetting control of the block. Of the numerical values described at each cell position of FIG. 14, the coordinate values of divided image are indicated at the upper stage and the cell number is indicated at the lower stage. In this example, only one boundary of cell is beyond the origin (0, 0) of browser to the right side in the X axis direction by moving the image by the scroll operation, and not in the Y axis direction (when the image is moved as shown in FIG. 11).

〔Display Magnification Change Control〕

The control for changing the display magnification during the perusal of the newspaper will be described below. This display magnification change control involves the control to change the display magnification with the mouse cursor (pointer) position as a steady point (i.e., so that the position on the paper where the mouse cursor is located may not be changed before and after magnification change.) FIG. 15 shows a control flow. The control of FIG. 15 is made by JavaScript described in the HTML transmitted from the Web server. The mouse cursor is placed at any position of the displayed image (article position where the peruser wants to peruse by changing the display magnification) on the newspaper during the perusal of the newspaper (S21). Then, the mouse is right clicked (S22). The coordinate values of the mouse cursor (pointer) at that time (pixel values whose origin is the origin (0, 0) of the browser) are acquired (S23). AS to the coordinate values $(X_{do}, Y_{do})$ of the origin of image, the initial value $(X_o, Y_o)$ is given by the expressions (5) and (6), and updated by the expressions (23) and (24) every time of scroll operation. Thereby, the coordinate values $(X_{do}, Y_{do})$ of the origin of image is already acquired at the time when the display magnification change operation is made.

Figure 16:
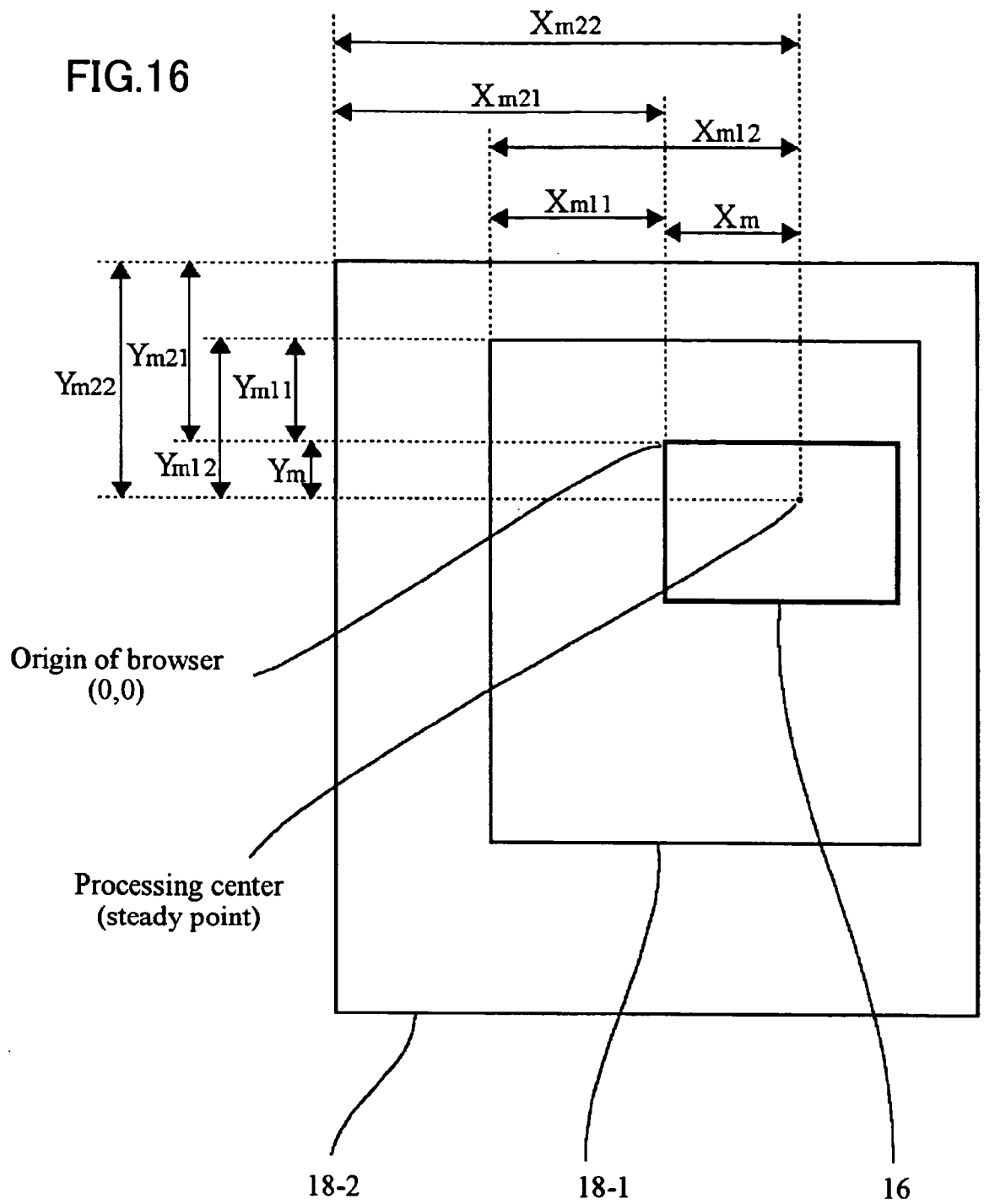
FIG. 16 is a view for explaining the contents of arithmetical operation to be performed at step S26 in FIG. 15.

A pop-up menu for selecting the display magnification is displayed by the right click operation of the mouse (S24). The peruser conducts an operation of selecting any magnification from among the numerical values (length ratios) of the display magnification displayed on the pop-up menu (S25). Then, the arithmetical operation for obtaining the origin position of the image required for displaying the image at the selected magnification is performed, with the mouse cursor position at the time of making the right click as the steady point (S26). Referring to FIG. 16, the contents of arithmetical operation will be described. In an example of FIG. 16, the image 1 (18-1) displayed before the display magnification change is enlarged and displayed as the image 2 (18-2) with the display magnification change operation position (mouse cursor position at the time of right click, hereinafter referred to as a "processing center") as the steady point.

In FIG. 16, the variables have the following meanings.

$X_m$: Distance between origin of browser and processing center in the X axis direction $X_{m11}$: Distance between origin of browser and origin of image 1 in the X axis direction $X_{m12}$: Distance between origin of image 1 and processing center in the X axis direction $X_{m21}$: Distance between origin of browser and origin of image 2 in the X axis direction $X_{m22}$: Distance between origin of image 2 and processing center in the X axis direction $Y_m$: Distance between origin of browser and processing center in the Y axis direction $Y_{m11}$: Distance between origin of browser and origin of image 1 in the Y axis direction $Y_{m12}$: Distance between origin of image 1 and processing center in the Y axis direction $Y_{m21}$: Distance between origin of browser and origin of image 2 in the Y axis direction $Y_{m22}$: Distance between origin of image 2 and processing center in the Y axis direction Assuming that the ratio of display magnification of image 2 to display magnification of image 1 is α (α>1), the following expressions hold.

$$X_{m22} = \alpha \cdot X_{m12} \quad \text{(Expression 35)}$$

$$Y_{22} = \alpha \cdot Y_{m12} \quad \text{(Expression 36)}$$

Also, from FIG. 16, $$X_{m12} = X_m + X_{m11} \quad \text{(Expression 37)}$$

$$Y_{m12} = Y_m + Y_{m11} \quad \text{(Expression 38)}$$

Substituting the expressions (37) and (38) for the expressions (35) and (36), $$X_{m22} = \alpha \cdot X_m + \alpha \cdot X_{m11} \quad \text{(Expression 39)}$$

$$Y_{m22} = \alpha \cdot Y_m + \alpha \cdot Y_{m11} \quad \text{(Expression 40)}$$

From FIG. 16, $$X_{m21} = X_{m22} - X_m \quad \text{(Expression 41)}$$

$$Y_{m21} = Y_{m22} - Y_m \quad \text{(Expression 42)}$$

Substituting the expressions (39) and (40) for the expressions (41) and (42), $$X_{m21} = (\alpha \cdot X_m + \alpha \cdot X_{m11}) - X_m = (\alpha-1)X_m + \alpha \cdot X_{m11} \quad \text{(Expression 43)}$$

$$Y_{m21} = (\alpha \cdot Y_m + \alpha \cdot Y_{m11}) - Y_m = (\alpha-1)Y_m + \alpha \cdot Y_{m11} \quad \text{(Expression 44)}$$

The coordinate values $(X_{m21}, Y_{m21})$ (pixel values) obtained by the expressions (43) and (44) indicate the origin position of image after magnification change.

If the origin position of image after magnification change through the above calculation is obtained at step S26 of FIG. 15, the divided images fitted into the 6×6 cells making up the block are calculated (S27). The number of pixels making up one divided image fitted into one cell is fixed, irrespective of the difference in the magnification, as previously described, for example, 480×480 pixels. The divided image fitted into each cell is calculated based on the expressions (11) to (16). That is, the coordinates $[x_f, y_f]$ of the first divided image (to which the origin (0, 0) of the browser belongs) entering the display region of the browser are obtained from the expressions (11) and (12) (in the expressions (11) and (12), the origin position $X_{m21}, Y_{m21}$ of image after magnification change obtained by the expressions (43) and (44) is employed, instead of the initial value $X_o, Y_o$ of the origin of image).

If the coordinates $[x_f, y_f]$ of the first divided image entering the display region of the browser are obtained, the coordinate value $x_f-1$ of divided image fitted into the cell $S_{xf}$ (X axis first cell) located at the left end of block is obtained by the expressions (13) and (14). Similarly, the coordinate value $y_f-1$ of divided image fitted into the cell $S_{yf}$ (Y axis first cell) located at the upper end of block is obtained. Moreover, supposing that the first cell $[S_{xf}, S_{yf}]$ is the zeroth cell, the coordinate values $[x_f-1+m, y_f-1+m]$ of the divided image fitted into the cell $[S_{xn}, S_{yn}]$ at the m-th (m=0, 1, ..., 5) place in the X axis direction and the n-th (n=0, 1, ... 5) place in the Y axis direction are obtained by the expressions (15) and (16).

At step S27 in FIG. 15, if the divided images fitted into the 6×6 cells making up the block are calculated through the above calculation, the display positions of the 6×6 cells making up the block on the browser are obtained from the expressions (19) to (22) (the origin position $X_{m21}, Y_{m21}$ of image after magnification change is employed, instead of the initial value $X_o, Y_o$ of the origin of image) (S28). That is, the coordinates of the origin of block are obtained from the expressions (19) and (20), and the coordinates of the origin of each cell are obtained from the expressions (21) and (22).

If the divided images after magnification change fitted into the 6×6 cells and their display positions are obtained in the above way, a request to the Web server is made for the divided images that are not acquired yet (S29), and the divided images already downloaded from the Web server and saved in the cache memory are read. The images newly downloaded from the Web server or read from the cache memory are fitted into the corresponding cell and displayed (S30).

In the above way, the display magnification is changed with the processing center as the steady point. Though in the above description, the image is enlarged and displayed, the image may be reduced and displayed with the same processing, except that the display magnification ratio α is α<1.

[Page Turning Control]

In perusing the newspaper, when an operation of turning to a certain page using a tool bar on the screen of the browser is made, as to the instructed page, the Web browser makes a request for the divided image at a predetermined magnification (a relatively low magnification to overlook the entire article of the paper) to the Web server, based on JavaScript described in the HTML (the divided image already downloaded from the Web server and saved in the cache memory is read and employed). The image is initially displayed in a state where the center of the display region of browser and the center of image are matched as on the initial screen at the early time of perusal. The scroll control and the magnification change control after the initial display are performed in the same way as previously described.

In the above embodiment, the image is divided in both the longitudinal and transverse directions, but may be divided in only one of the longitudinal and transverse directions. Also, the cells (frame elements) are arranged in both the longitudinal and transverse directions, but may be arranged in only one of the longitudinal and transverse directions. Also, the divided image and the cell are square, but may be rectangular. The divided image and the cell may be other than square or rectangular. Also, the number of cells making the block is the same in the longitudinal and transverse directions, but may be different. Also, the block is offset beforehand by one cell to the left side and to the upper side in the display region of browser, but the amount of offset may be two or more cells. Also, the divided image is provided beforehand in the server, but transmitted, waiting for a request from the viewer, but the divided image may be generated and transmitted, waiting for a request from the viewer. Also, the surrounding divided images are downloaded, waiting for a scroll operation after the initial display, but after the initial display, the surrounding divided images are sequentially downloaded without waiting for a scroll operation. Also, the newspaper is perused in this embodiment, but this invention may be applied to the perusal of other images (e.g., cartoons). Also, the image is perused employing the Web browser, but this invention may be applied to the perusal of image employing the plug-in software.

What is claimed is:

1. An image display method for downloading an image larger than a display region of a viewer from a server and displaying said image on said viewer, comprising:
   downloading an image to a viewer;
   dividing said image into a plurality of areas, so that each divided image may be transmittable from said server,
   determining each divided image at least a part of which is contained in said display region of said viewer in accordance with a relative position between said image and said display region of said viewer, and enabling the corresponding divided image to be preferentially transmitted from said server further comprising the steps of:
   setting a predetermined number of frame elements on said viewer which comprise a block, said frame elements corresponding to the display region to be fitted with and to display the divided images contained within a limited range of image area in a predetermined positional relation to the display region of said viewer, including the divided image at least apart of which is contained in said display region of said viewer, the divided image at a corresponding position being fitted into each frame element and displayed, and when a relative movement of the image in the display region is instructed, said viewer calculates the coordinates of the origin of said each frame element to be moved, and the origin of each frame element is moved to the calculated coordinates to implement said relative movement of said image in the display region wherein said divided image is obtained by dividing the image like a lattice in the transverse direction in which a predetermined number bf consecutive divided images in the transverse direction are fitted into said frame elements, said divided image is obtained by dividing the image like a lattice in the longitudinal direction in which a predetermined number of consecutive divided images in the longitudinal direction are fitted into said frame elements, or said divided image is the image divided like a lattice in the transverse and longitudinal directions in which a predetermined number of consecutive divided images in the transverse direction, a predetermined number of consecutive divided images in the longitudinal direction, or a predetermined number of divided images in the transverse direction and a predetermined number of divided images in the longitudinal direction are fitted into said frame elements.

2. An image display method for downloading an image larger than a display region of a viewer from a server and displaying said image on said viewer as defined in claim 1 comprising: dividing said image into a plurality of areas, each divided image being provided beforehand in said server, determining each divided image at least a part of which is contained in said display region of said viewer in accordance with a relative position between said image and said display region of said viewer, and enabling the corresponding divided image to be preferentially transmitted from said server.

3. An image display method for downloading an image larger than a display region of a viewer from a server and displaying said image on said viewer as defined in claim 1 comprising: dividing said image into a plurality of areas, each area having a shorter length in one or both of a transverse direction and a longitudinal direction than said display region of said viewer, each divided image being provided beforehand in said server, determining each divided image at least a part of which is contained in said display region of said viewer in accordance with a relative position between said image and said display region of said viewer, and enabling the corresponding divided images to be preferentially transmitted from said server, in which said transmitted divided images are rearranged in an original state and displayed on said viewer.

4. An image display method for downloading an image larger than a display region of a viewer from a server and displaying said image on said viewer as defined in claim 1 comprising: dividing said image into a plurality of areas, each divided image being provided beforehand in said server, said viewer determining each divided image at least apart of which is contained in said display region of said viewer in accordance with a relative position between said image and said display region of said viewer, and making a preferential request to the server for said divided image, and said server preferentially transmitting said divided image in response to said request, iii which said viewer displays the received divided image.

5. An image display method for downloading an image larger than a display region of a viewer from a server and displaying said image on said viewer as defined in claim 1 comprising: dividing said image into a plurality of areas, each area having a shorter length in one or both of a transverse direction and a longitudinal direction than said display region of said viewer, each divided image being provided beforehand in said server, said viewer determining each divided image at least a part of which is contained in said display region of said viewer in accordance with a relative position between said image and said display region of said viewer, and making a preferential request to the server for said divided images, and said server preferentially transmitting said divided images in response to said request, in which said viewer rearranges and displays the received divided images in an original state.

6. The image display method according to claim 1 further comprising:
   determining each surrounding divided image adjacent to the area of said divided image contained in said display region of said viewer, which is contained within a limited range of image area in a predetermined positional relation to the display region of said viewer, and enabling the corresponding divided image to be preferentially transmitted from said server.

7. The image display method according to claim 1 further comprising:
   determining whether or not said divided image is already downloaded and stored in said viewer, in which if said divided image is already stored, said stored divided image is read out and displayed without downloading it from the server again.

8. The image display method according to claim 1 wherein said divided image is obtained by dividing the image like a lattice in one or both of the transverse direction and the longitudinal direction.

9. The image display method according to claim 8, wherein said lattice is formed by dividing said image in the transverse direction at every preset number of pixels from a left end position of said image as a start point, formed by dividing said image in the longitudinal direction at every preset number of pixels from an upper end position of said image as the start point, or formed by dividing said image in the transverse direction at every preset number of pixels from the left end position of said image as the start point and dividing said image in the longitudinal direction at every preset number of pixels from the upper end position of said image as the start point.

10. The image display method according to claim 1 wherein proper identification information is attached to said each frame element, and said viewer holds said proper identification information associated with information of the display position of said frame element in the display region of said viewer and identification information of the divided image fitted into said frame element, and displays the divided image fitted into each frame element at the corresponding position in the display region of said viewer, based on said information.

11. The image display method according to claim 10 wherein the identification information of said divided image is composed of information corresponding to an address in the entire image, in which said viewer makes a request to the server for said divided image with the identification information of said divided image, and said server discriminates the divided image corresponding to said identification information and transmits it to said viewer.

12. The image display method according to claim 10 wherein the identification information of said divided image has no information for identifying a file format of each divided image.

13. The image display method according to claim 1 wherein the image having the same contents are transmittable from the server at a plurality of magnifications and by dividing said image into a plurality of areas at each magnification, the image being displayed at a magnification instructed from the viewer by said method wherein the number of pixels at which the image is divided in the transverse direction, or the longitudinal direction, or the transverse and longitudinal directions, is equal irrespective of the magnification and wherein when a magnification change operation is performed by placing a pointer at a position on said image in a state where the image is displayed at one magnification, the image is displayed at the changed magnification with the position on said image where said pointer is located as a steady point.

14. The image display method according to claim 1 wherein the image having the same contents is transmittable from the server at a plurality of magnifications and by dividing said image into a plurality of areas at each magnification, the image being displayed at a magnification instructed from the viewer by said method, in which the number of frame elements is equal, irrespective of the magnification.

15. The image display method according to claim 1 wherein said viewer is a Web browser, each arithmetical operation at said Web browser being executed based on a JavaScript (registered trademark) stored in an HTML transmitted from the server.

16. The image display method according to claim 15, wherein said frame element is set up, employing <DIV> tags described in the HTML transmitted from the server.

17. The image display method according to claim 15, wherein the attribute information such as a file name and/or a file format for said each divided image is not incorporated into the HTML transmitted from the server.

\* \* \* \* \*